US005990409A

United States Patent [19]

Takahashi et al.

[11] Patent Number: 5,990,409

[45] Date of Patent: Nov. 23, 1999

[54] MUSICAL APPARATUS DETECTING MAXIMUM VALUES AND/OR PEAK VALUES OF REFLECTED LIGHT BEAMS TO CONTROL MUSICAL FUNCTIONS

[75] Inventors: Shigeru Takahashi; Akira Matsui, both of Osaka, Japan

[73] Assignee: Roland Kabushiki Kaisha, Osaka, Japan

[21] Appl. No.: 09/219,258

[22] Filed: Dec. 22, 1998

[30] Foreign Application Priority Data

Dec. 26, 1997 [JP] Japan .................................... 9-360015

[51] Int. Cl.[6] ...................................................... G01H 3/06

[52] U.S. Cl. ................................................ 84/724; 341/41

[58] Field of Search ......................... 84/723, 724; 341/41

[56] References Cited

U.S. PATENT DOCUMENTS 3,405,222 10/1968 Heinzl .
4,321,463 3/1982 Stecher ................................. 84/724 X
4,468,999 9/1984 Bonanno .
5,045,687 9/1991 Gurner .................................. 250/221
5,237,126 8/1993 Curtis et al. ............................ 84/724
5,369,270 11/1994 Gurner et al. ......................... 250/221
5,414,256 5/1995 Gurner et al. ......................... 250/221
5,442,168 8/1995 Gurner et al. ......................... 250/221
5,459,312 10/1995 Gurner et al. ......................... 250/221
5,473,461 12/1995 Miremadi ............................... 359/189
5,475,214 12/1995 DeFranco et al. ...................... 250/221
5,508,511 4/1996 Zur et al. ............................. 250/222.1
5,833,549 11/1998 Zur et al. ............................... 473/199

FOREIGN PATENT DOCUMENTS 58-195296 12/1983 Japan .
7-98583 4/1995 Japan .
9-269776 10/1997 Japan .

*Primary Examiner*—Jeffrey Donels
*Attorney, Agent, or Firm*—Lyon & Lyon LLP

[57] ABSTRACT

A musical apparatus which outputs music under the control of various musical control instructions where the desired musical control instructions are reliably determined by the movement of an object in an operation space, and where the musical control instructions are varied by changing the state of motion of the object in space.

The musical apparatus performs musical control instructions whose contents are based on the state of motion of an object in motion within a specified operation space. The musical apparatus may have at least one light source which shines light into said operation space, at least one light sensor which receives light which has been reflected by an object in the space so that it has at least two light paths which reach from the light source to the light sensor via the object, so that a detection values is output according to the quantity of light received via a respective one of the light paths, and a musical controller which outputs music and controls a musical function when the correlation between the current values of the detection values of the various paths satisfies a specified relationship.

21 Claims, 16 Drawing Sheets

DATA STRUCTURE OF ONE PHRASE

| |
|---|
| TYPE OF EFFECT |
| PERFORMANCE DATA |

RAM DATA

| |
|---|
| A (CURRENT VALUE OF LED1A) |
| B (CURRENT VALUE OF LED1B) |
| AMAX (MAXIMUM VALUE OF LED1A) |
| BMAX (MAXIMUM VALUE OF LED1B) |
| MAXIMUM VALUE WRITE ENABLE FLAG |
| LR TRIGGER FLAG |
| RL TRIGGER FLAG |
| NUMBER OF PHRASE 1 |
| NUMBER OF PHRASE 2 |
| NUMBER OF PHRASE 3 |

A: CURRENT VALUE OF LED 1A
B: CURRENT VALUE OF LED 1B
AMAX: MAXIMUM VALUE OF LED 1A
BMAX: MAXIMUM VALUE OF LED 1B

| | | | |
|---|---|---|---|
| LEVEL L:50 R:70 | | | |
| MODE = 1 | | | |
| L → R | L ← R | ↕ VERTICAL | VALUE |
| STOP | TRIGGER | PHRASE 1 | 0~33 |
| | | PHRASE 2 | 34~66 |
| | | PHRASE 2 | 67~99 |

WHEN MODE = 1

| LEVEL L:50 R:70 | | | |
|---|---|---|---|
| MODE = 2 | | | |
| L → R | L ← R | ↕ VERTICAL | VALUE |
| LOOP TRIGGER / LOOP STOP | ONE SHOT TRIGGER | PHRASE 1 | 0~33 |
| | | PHRASE 2 | 34~66 |
| | | PHRASE 2 | 67~99 |

WHEN MODE = 2

*FIG. 14*

| LEVEL L:50 R:70 | | | |
|---|---|---|---|
| MODE = 3 | | | |
| L → R | L ← R | ↕ VERTICAL | VALUE |
| EFFECT OFF + TRIGGER | EFFECT ON + TRIGGER | PHRASE 1 | 0~33 |
| | | PHRASE 2 | 34~66 |
| | | PHRASE 2 | 67~99 |
| EFFECT TYPE | | CHORUS REVERSE EQ | |

WHEN MODE = 3

*FIG. 15*

| LEVEL L:50 R:70 | | |
|---|---|---|
| MODE = 4 | | |
| L → R | L ← R | ↕ VERTICAL |
| PREVIOUS PHRASE TRIGGER | NEXT PHRASE TRIGGER | VOLUME CONTROL |

WHEN MODE = 4

FIG. 16

| LEVEL L:50 R:60 | | | |
|---|---|---|---|
| MODE = 5 | | | |
| L → R | L ← R | ↕ VERTICAL | VALUE |
| SEQUENCER MUTE ON TRIGGER / SEQUENCER MUTE OFF | TRIGGER | PHRASE 1 | 0~33 |
| | | PHRASE 2 | 34~66 |
| | | PHRASE 2 | 67~99 |

WHEN MODE = 5

FIG. 17

| LEVEL L:50 R:70 | | | |
|---|---|---|---|
| MODE = 6 | | | |
| L → R | L ← R | ↕ VERTICAL | VALUE |
| DECREMENT | INCREMENT | VOICE GROUP | 0~50 |
| | | VOICE NO. | 51~99 |

WHEN MODE = 6

FIG. 18

| LEVEL L:50 R:60 | | | |
|---|---|---|---|
| MODE = 7 | | | |
| L → R | L ← R | ↕ VERTICAL | VALUE |
| OFF | ON | WOW | 0~33 |
| | | DISTORTION | 34~66 |
| | | REVERB | 67~99 |

WHEN MODE = 7

FIG. 19

| | | | |
|---|---|---|---|
| LEVEL L:50 R:60 | | | |
| MODE = XX | | | |
| L → R | L ← R | ↕ VERTICAL | VALUE |
| UP STROKE | DOWN STROKE | CMAJ | 0~33 |
| | | AMIN | 34~66 |
| | | GMAJ7 | 67~99 |

FIG. 20

FIG. 23
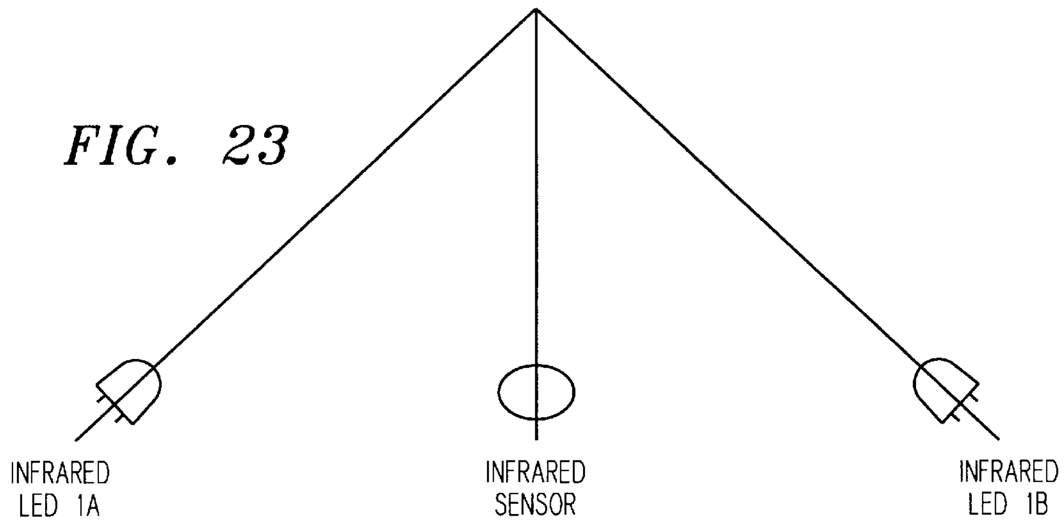
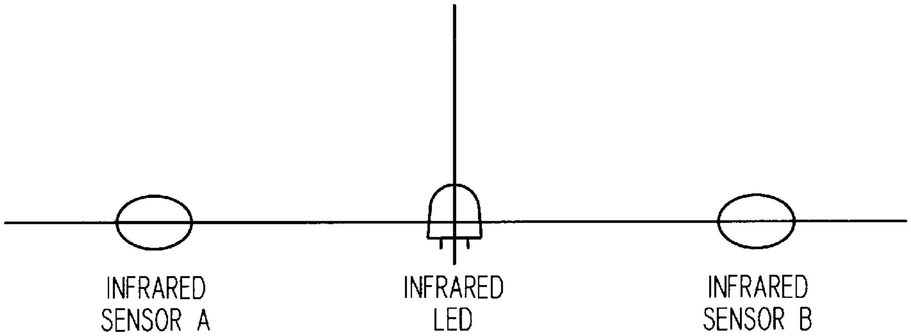
FIG. 24
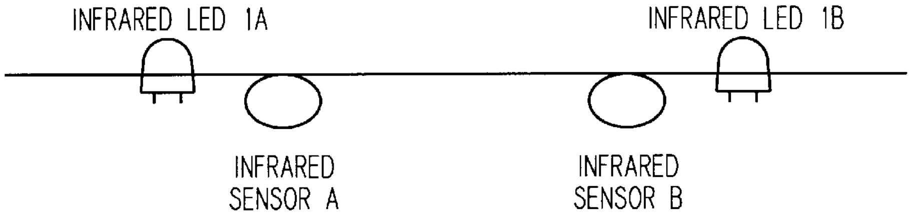
FIG. 25
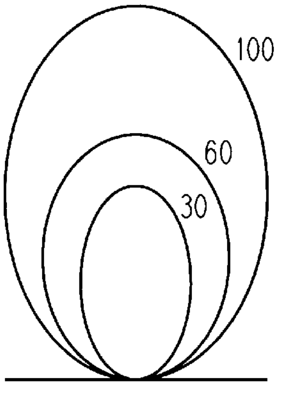
FIG. 26

MUSICAL APPARATUS DETECTING MAXIMUM VALUES AND/OR PEAK VALUES OF REFLECTED LIGHT BEAMS TO CONTROL MUSICAL FUNCTIONS

CROSS REFERENCE TO RELATED PATENT APPLICATIONS

The entire disclosure of U.S. patent application Ser. No. 09/209,400, entitled MUSICAL APPARATUS USING MULTIPLE LIGHT BEAMS TO CONTROL MUSICAL TONE SIGNALS filed on Dec. 10, 1998 and which is based on Japanese Patent Application Hei 9-362074, filed on Dec. 11, 1997, is incorporated herein by reference in its entirety.

FIELD OF THE INVENTION

The field of the invention is electronic musical apparatuses such as electronic musical instruments, music-related sound generation devices, music-related sound modification devices, and their controllers, including, for example, synthesizers, keyboards, drum machines, effects processors, effects pedals, sequencers and sound modules. More specifically, the electronic musical apparatus embodying the invention is controlled by detecting the location and/or movement of an object (e.g., a hand) within a space by using a light beam, including an infrared light beam.

BACKGROUND OF THE INVENTION

Non-contact musical control devices have been known in the past which issue control instructions by optically detecting the movement of a hand or the like within a specified space. These devices provided a pair consisting of one light source (infrared emitting diode or the like) which shines a light into the space and one light receiving element (infrared sensor or the like) which receives the light of the light source which has been reflected by the hand when said hand proceeds into said space, and if reflected light was received by the light receiver, the device performed a switch-like control which turned the instruction for a specified operation ON when said received light quantity exceeded a certain threshold value, and turned it OFF when it was below the threshold value.

The intensity distribution of the light beam irradiated from the light source in the conventional non-contact musical control devices described above is as shown, for example, in FIG. 26. In this case, the light quantity received by the light receiver will differ, even if the hand is held at the same height from the light receiver, when the hand is held directly above the light source as compared to when it is held to the side. Consequently, in a case where ON/OFF operation instructions are performed according to whether or not the quantity of received light exceeds a specified threshold value, the probability of erroneous operation is high if the operation instruction is performed based purely on the height of the hand as the only scale. In other words, a problem with this type of prior musical control device is that it was difficult for the operator to discern at what proximity to the sensor the switch will be turned ON or OFF. In addition, the type of the operation instruction was limited to whether to perform a certain control, i.e., no more than the binary ON/OFF control of a single specified process could be accomplished.

SUMMARY OF THE INVENTION

Electronic musical apparatuses described herein include electronic musical instruments, music-related sound generation devices, music-related sound modification devices, and their controllers, including, for example, synthesizers, keyboards, drum machines, effects processors, effects pedals, sequencers and sound modules.

A first, separate aspect of the invention is an electronic musical apparatus which executes desired operation instructions more accurately by detecting the characteristics of the movement of an object within an operation space, and further performing a variety of types of operation instructions in response to the state of motion of the object.

A second, separate aspect of the invention is an electronic musical apparatus which is able to distinguish between various types of movement of an object in an operation space.

A third, separate aspect of the invention is an electronic musical apparatus which is able to determine whether an object in moving from right to left, or left to right, in the operation space, and to control a musical function based on the direction of movement of the object.

A fourth, separate aspect of the invention is an electronic musical apparatus which is able to determine whether an object in moving horizontally or vertically relative to the light sensor and to control a musical function based on the direction of movement of the object.

A fifth, separate aspect of the invention is an electronic musical apparatus which controls a first musical function based on the horizontal movement of an object in the operation space and controls a second musical function based on the vertical movement of the object.

A sixth, separate aspect of the invention is an electronic musical apparatus which detects the peak value of the detection value of light reflected off an object in space and controls a musical function based on the peak value.

A seventh, separate aspect of the invention is an electronic musical apparatus which detects a detection value for each light path from light source to the object in space to the light receiver and controls a musical function based on a relationship between the detection values.

A eighth, separate aspect of the invention is an electronic musical apparatus in which the axes on which the light beams of the light sources incline outwardly from one another.

BRIEF DESCRIPTION OF THE DRAWINGS

FIG. 14 is a drawing showing a typical example of the display screen during Mode 2 in the device of the embodiment of FIG. 1.

FIG. 15 is a drawing showing a typical example of the display screen during Mode 3 in the device of the embodiment of FIG. 1.

FIG. 16 is a drawing showing a typical example of the display screen during Mode 4 in the device of the embodiment of FIG. 1.

FIG. 17 is a drawing showing a typical example of the display screen during Mode 5 in the device of the embodiment of FIG. 1.

FIG. 18 is a drawing showing a typical example of the display screen during Mode 6 in the device of the embodiment of FIG. 1.

FIG. 19 is a drawing showing a typical example of the display screen during Mode 7 in the device of the embodiment of FIG. 1.

FIG. 20 is a drawing showing a typical example of the display screen during a mode which performs an operation based also on the motion velocity of the object in the device of the embodiment of FIG. 1.

FIG. 23 is a side view of an example configuration of light emitting diodes and a sensor as another example embodiment of the invention.

FIG. 24 is a side view of an example configuration of a light emitting diode and a sensor as yet another example embodiment of the invention.

FIG. 25 is a side view of an example configuration of light emitting diodes and a sensor as still another example embodiment of the invention.

FIG. 26 is a drawing explaining the radiation characteristics of light emitting diodes in an example of the prior art.

Legend

1A, 1B infrared light emitting diodes

2, 2A, 2B infrared sensors

3 CPU (Central Processing Unit)

4 main ROM (Read Only Memory)

5 RAM (Random Access Memory)

6 operation elements and displays on panel

7 sequencer

8 sound source

9 effecter

DETAILED DESCRIPTION OF THE PREFERRED EMBODIMENTS

The various embodiments of the invention will be explained below with reference to the figures.

A first embodiment of the invention is an electronic musical apparatus which outputs music and performs musical control instructions based on the state of motion of objects in motion within a specified operation space. The first embodiment includes an optical element which has at least one light source which shines light into said operation space and at least one light sensor which receives light which has been reflected by an object in the operation space so that it has at least two light paths which travel from the light source to the light sensor via the object. The first embodiment outputs a detection value respectively based on the quantity of light received via each of the paths. The embodiment includes a signal generator which generates music and a musical controller which, when the correlation between the current values of the detection values satisfies a specified relationship, controls a musical function of the music being generated.

Since this musical apparatus allows musical control instructions to be performed when the correlation between the detection values of the various paths satisfy a specified relationship (for example, when they reach the same value) based on the detection values of light reflected from an object from at least two paths, the position of the object within the operation space can be more easily and accurately determined as compared to a conventional device having one light source and one light sensor. As a result, the operator can more accurately control the timing of the generation of the musical control instruction by moving and manipulating the object.

For instance, in the first embodiment, the optical element comprises two light sources and a light sensor situated at the midway position between the two light sources on a straight line, and each light source emits chronologically alternating lights and the lights from the respective light sources are received by the light sensor in a time multiplexed fashion. Consequently, two types of detection signals are obtainable. Thus, the operator can more accurately control the timing of the generation of the musical control instruction by moving and manipulating the object because the position at which these detection values are equal is normally in the vicinity of being directly above the light sensors.

The relationship between the detection values which triggers the musical control instruction is not limited only to the case when the detection values become equal in value, but may also be, for example, when the difference between the detection values falls within a specified range, or when the ratio of the detection values reaches a specified value.

Figure 1:
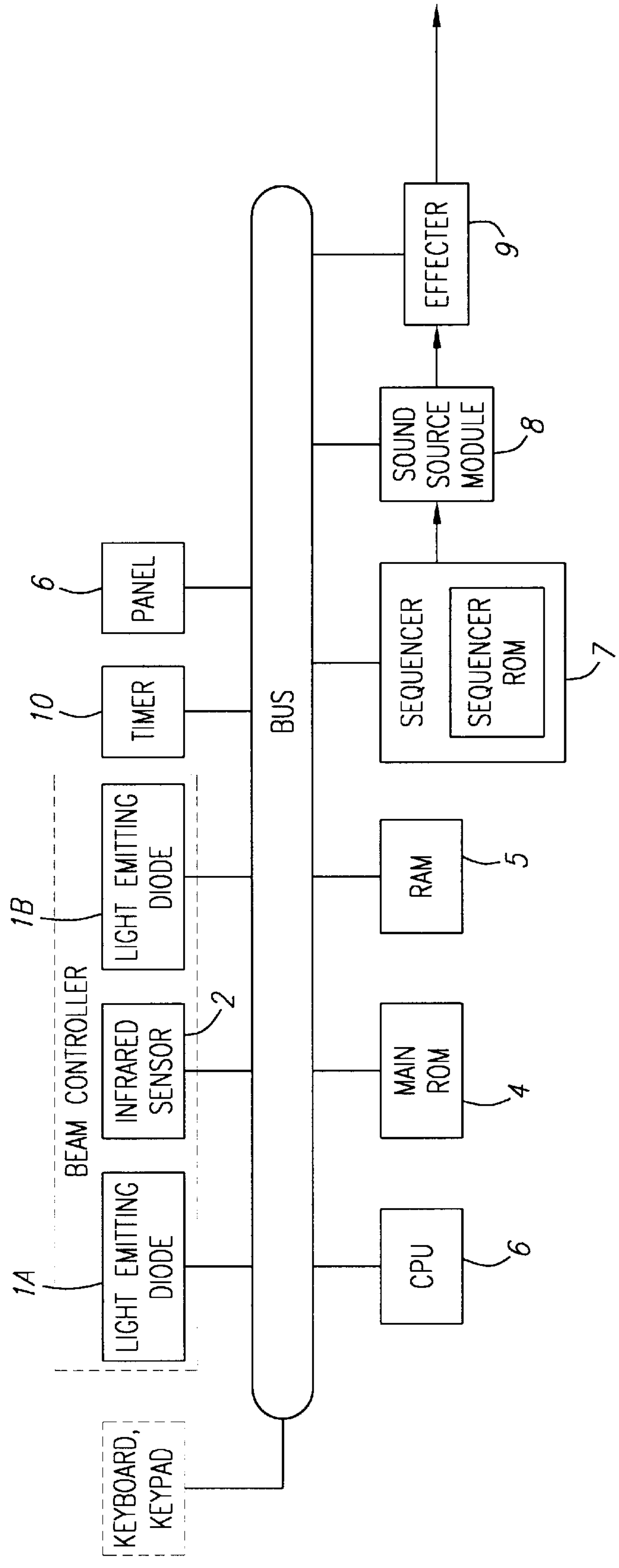
FIG. 1 is a drawing showing the hardware configuration of an electronic musical instrument as an example embodiment of the invention.

FIG. 1 is a hardware configuration diagram wherein the musical apparatus has been applied to an electronic musical instrument as an example embodiment of the invention, wherein two infrared emitting diodes and one infrared sensor are used in an optical sensor component that detects motion of an object (for example, a hand). FIG. 1 depicts the various infrared emitting diodes 1A and 1B (hereinafter, referred to simply as light emitting diodes) and an infrared sensor 2 which detects infrared rays. The light from the light sources described above is not limited to infrared light, but may also be normal visible light or ultraviolet light, etc. CPU 3 (central processing unit) performs general control of the device. The main ROM 4 stores the control programs and various tables. A working RAM 5 stores various registers and flags, etc., described below. The element with reference numeral 6 represents various operation elements and indicators which are arranged on a panel. FIG. 1 also shows a sequencer 7, sound source 8, an effecter 9, and a timer 10, all of which are connected to one another by a bus 11.

The sequencer 7 is capable of simultaneously performing up to eight phrases, and the performance data for 100 phrases are stored in a ROM inside the sequencer (sequencer ROM 71). The sequencer 71 is able to play back one song data apart from these phrases. Song data for ten songs are stored in the sequencer ROM 71.

The sound source 8 has a multi-timbral configuration capable of simultaneously playing "128" voices, and sequencer 7, sound source 8, effecter 9, and bus 11 are connected as shown in the figure.

The timer 10 starts when the beam controller button in FIG. 2, described below, is pressed and turned ON which generates an interrupt every 5 milliseconds to the CPU 3 and causes the timer interrupt routine, described below, to be executed.

Figure 2:
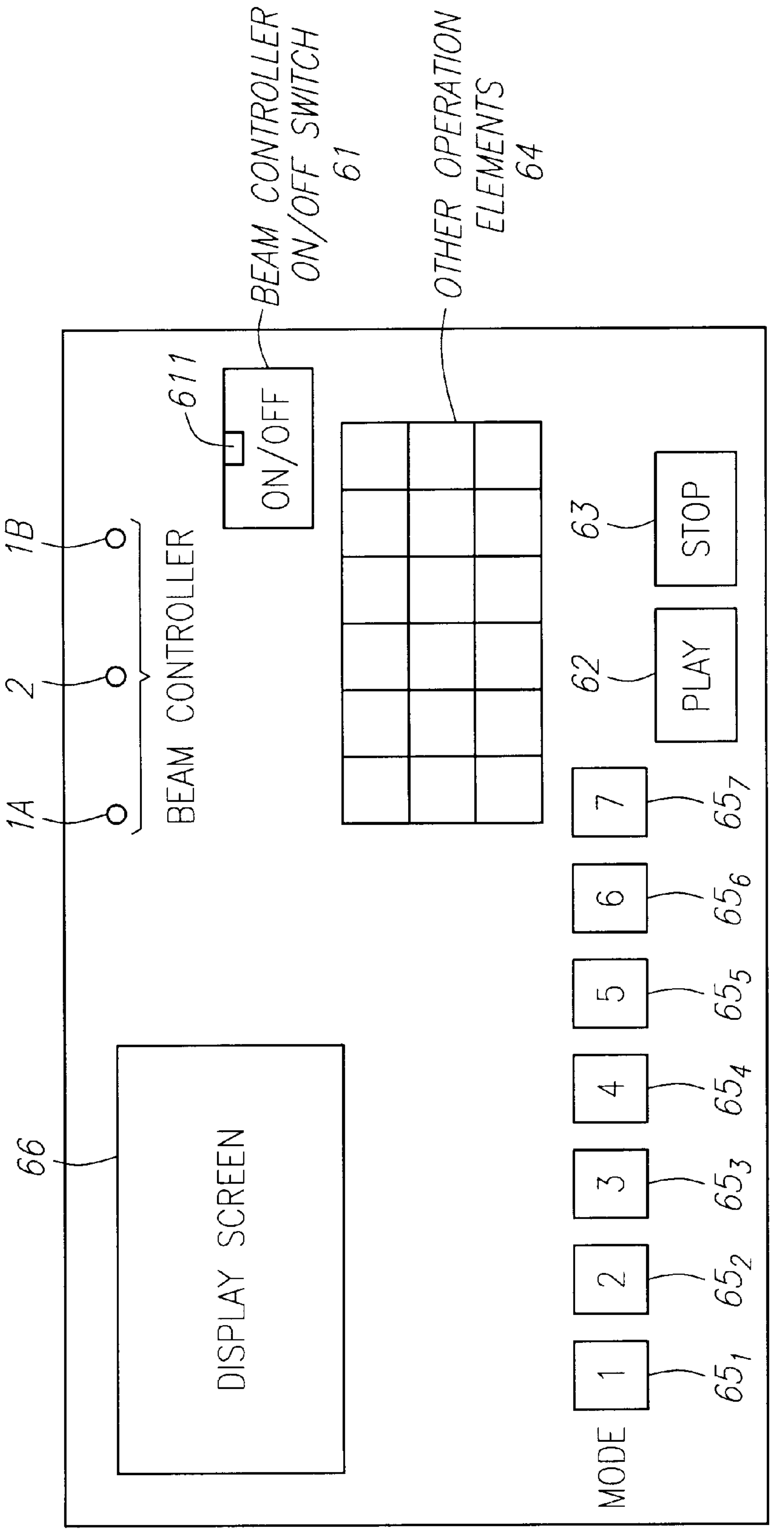
FIG. 2 is a drawing showing the panel configuration of the device of the example embodiment of FIG. 1.

An external view drawing of the panel in the device of this example embodiment is shown in FIG. 2. The beam controller, consisting of the two light emitting diodes 1A, 1B and the infrared sensor 2, is situated on the panel. The light emitting diodes 1A, 1B are arranged on a lateral line, as viewed from the front of the panel of the electronic musical instrument, with the infrared sensor 2 situated midway between them. The space above this beam controller in the panel is the operation space for performing operation instructions by moving an object (typically, a hand). This beam controller is turned ON/OFF by pressing a beam controller button 61 situated in its vicinity.

Figures 3, 4, 5:
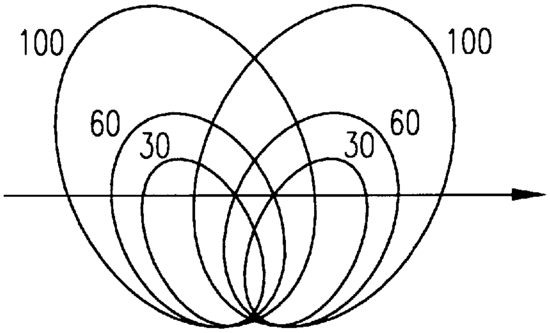
FIG. 3 is a drawing explaining the data structure of a phrase which is used in the device of the embodiment of FIG. 1.
FIG. 4 is a drawing showing the structure of data which is stored in RAM in the device of the embodiment of FIG. 1.
FIG. 5 is a drawing showing the equal-level curves of detection value RA and detection value RB in the device of the embodiment of FIG. 1, as viewed from the side.

The light emitting diodes 1A, 1B are controlled to turn ON/OFF in a time multiplexed manner so that the timing of their respective light emissions differ from each other and consequently, their infrared beams are not simultaneously irradiated inside the operation space. In addition, the light emitting diodes 1A, 1B are situated so that their beam irradiation directions are inclined outward from one another from the plumb direction to the panel. The equal-level curves of infrared beams irradiated from these light emitting diodes 1A, 1B are shown in FIG. 5. FIG. 5 illustrates the equal-level curves when the electronic musical instrument of this example embodiment is viewed from the front in the lateral direction on the panel surface, wherein it can be seen that the infrared beams of the light emitting diodes 1A, 1B are inclined outward from each other. By inclining the light axes of the two light sources outward from one another, the lights can be radiated so that there is a radiation field in the operation space in which at least portions of the two lights do not overlap, making it possible to make the object motion detector more compact. In addition, they are set inclining outward from each other so that the operation of moving the object in a lateral direction inside the operation space can be accurately detected by shifting it in the lateral direction when the irradiation space of the infrared beams irradiated by the various light emitting diodes 1A, 1B is viewed from the front.

The infrared sensor 2 is an element which receives the infrared beams which have been irradiated from the light emitting diodes 1A, 1B and reflected back by an object in the operating space, and then outputs an electrical quantity according to the level of said received light. Because lighting of the light emitting diodes 1A, 1B is controlled in time multiplexed fashion, the infrared sensor 2 receives the infrared rays (reflected lights) of the light emitting diodes 1A, 1B at chronologically alternating time periods. In this example embodiment, the level of the infrared ray which has been radiated from the light emitting diode 1A and reflected back from the object shall be "detection value RA," while the level of the infrared ray which has been radiated from the light emitting diode 1B and reflected back from the object shall be "detection value RB."

The other operation elements 64 are operation elements which are used to select the phrase which is to be registered in the PHRASE1 register—PHRASE3 register provided in RAM 5, or for selecting the song data to be played back by the sequencer, and since they employ common selection methods, a detailed explanation is not necessary. In addition, the MODE buttons $65_1$–$65_7$ are operation elements for selecting the mode, which will be described below, enabling selection of any of Modes 1–7. The PLAY button 62 is the button for playing back the selected song data and the STOP button 63 is the button for stopping playback.

The performance data for the phrase stored in ROM 7 inside the sequencer 7 has a data structure like that shown in FIG. 3. In other words, besides the performance data for the phrase, the type of effect desired for that phrase (e.g., chorus, reverb, etc., used in the Mode 3 example described below) also are stored here.

FIG. 4 shows the structure of data stored in RAM, which contain the following types of registers and flags:

MODE register: Contains the number of the current mode (initialized to MODE=1 when power is turned ON).

A register: Contains the current detection value RA as current value A (initialized to 0 when power is turned ON).

B register: Contains the current detection value RB as current value B (initialized to 0 when power is turned ON).

Amax register: Contains the maximum value Amax for detection value RA up to the present (initialized to 0 when power is turned ON).

Bmax register: Contains the maximum value Bmax for detection value RB up to the present (initialized to 0 when power is turned ON).

Maximum Value Write Enable flag: Flag indicating whether write to register Amax and Bmax is enabled or disabled (initialized to ON when power is turned ON). ON indicates write enabled; OFF indicates write disabled.

LR Trigger flag: Flag indicating that an object has passed through the lateral midway point (in the vicinity directly above the infrared sensor 2) above the beam controller moving from left to right, as viewed from the panel face (initialized to ON when power is turned ON).

RL Trigger flag: Flag indicating that an object has passed through the lateral midway point moving from right to left (initialized to OFF when power is turned ON).

PHRASE1 register: Contains the number of the phrase registered as the first phrase.

PHRASE2 register: Contains the number of the phrase registered as the second phrase.

PHRASE3 register: Contains the number of the phrase registered as the third phrase.

The operation of the device of this example embodiment will be explained below.

In the device of this example embodiment, a variety of operation instructions can be executed by moving an object laterally or vertically inside the operating space above the beam controller situated on the panel. The content of these operation instructions can be changed based on whether the object was moved from right to left (as viewed from the panel face), or whether it was moved from left to right, and at about what height the object was at the time (as viewed from the panel surface).

Figure 6:
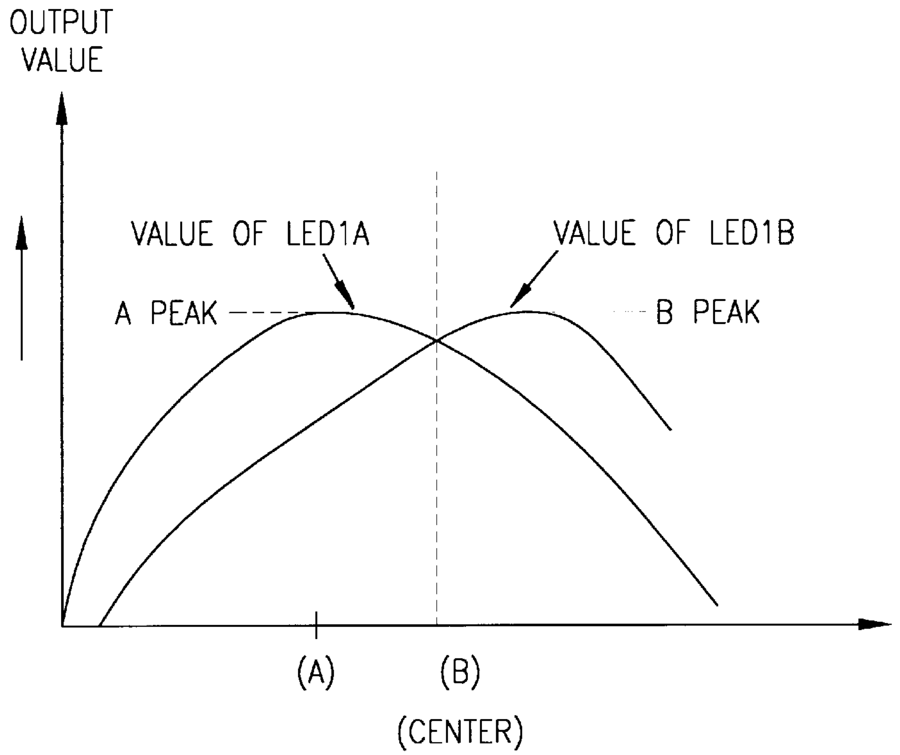
FIG. 6 is a drawing showing the characteristics of detection value RB and detection value RB when an object has passed over the sensor in the horizontal direction in the device of the embodiment of FIG. 1.

Since the respective beam irradiation directions of the light emitting diodes 1A, 1B of the beam controller are inclined outwardly, when for example, an object (e.g., a hand) is moved in the direction shown by the arrow in FIG. 5 (in the direction from left to right), the respective detection values RA, RB of the light emitting diodes 1A, 1B show characteristics like those shown in FIG. 6. In FIG. 6, the horizontal axis is the position of the object in the horizontal direction as viewed from the front surface of the beam controller (panel face), and the vertical axis is the values for the detection values RA, RB. First, when discussing the characteristics corresponding with the infrared beam from light emitting diode 1A, since the light reflected to the infrared sensor 2 increases as the object enters the operation space from the left side and approaches the light emitting diode 1A, the detection value RA gradually increases, ultimately reaching a peak value RApeak (the apex area in the characteristic) which corresponds to the height of the object in the vicinity of the position of the light emitting diode 1A, and then, since the object subsequently retreats from the light emitting diode 1A, the detection value RA gradually decreases, resulting in a hill shape like that shown in the figure. Similarly, the characteristic related with the infrared beam from the light emitting diode 1B also has a hill shape whose peak value is RBpeak, except that the position at which the detection value RB reaches its peak value is in the vicinity of light emitting diode 1B. It can be easily understood that similar characteristics are obtained when an object is moved so as to enter the operation space from right to left.

As can be seen from the characteristics in FIG. 6, the position at which the two detection values RA, RB reach the same value is in the vicinity of being directly above the infrared sensor, and the amplitudes (absolute values) of the detection values RA, RB depend on the height at which the object was moved over the panel. Whether the object was moved from right to left, or whether it was moved from left to right, can be determined by analyzing which of the detection values RA or RB reached its peak value first. In the device of the example embodiment, the content of the operation instructions is switched based on these motion characteristics of the object, and the content of those operation instructions is further switched for each mode.

Figures 12, 13:
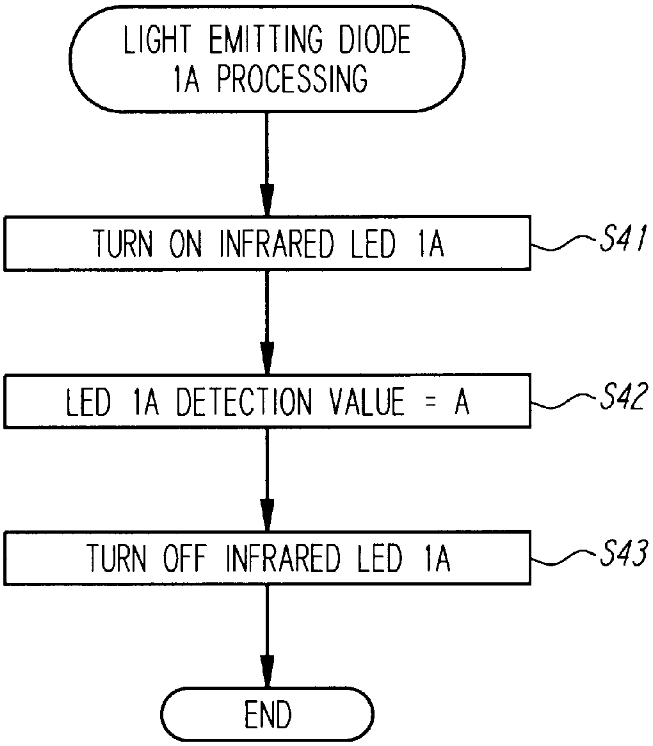
FIG. 12 is a flow chart showing the processing in the light emitting diode 1A in the device of the embodiment of FIG. 1.
FIG. 13 is a drawing showing a typical example of the display screen during Mode 1 in the device of the embodiment of FIG. 1.

Selection of the mode is accomplished by pressing any one of the MODE buttons $65_1$–$65_7$. Typical display screens corresponding with Modes 1–7 are shown in FIG. 13 through FIG. 19. The display screen is displayed on a display 66 on the panel. The detailed contents of the operation instructions in each mode will be discussed below. First, an example of a typical display screen format will be explained here, referring to the display screen for Mode 1 shown in FIG. 13, and the detailed contents of Modes 1–7, shown in FIG. 13 through FIG. 19, will be discussed below. In FIG. 13, the display screen displays the detection values RA, RB corresponding to each of the light emitting diodes 1A, 1B in the format "L:OO" and "R:XX," and displays the number of the current mode in the format "MODE=Δ." In addition, the content of the operation instruction performed relative to the desired target device (e.g., sequencer, sound source, or effecter, etc.) when the object is moved from left to right is displayed under "L→R," while the content of the operation instruction performed when the object is moved from right to left is displayed under "L←R." The contents of these operation instructions are, for example, a stop performance instruction to the sequencer on "L→R" and a start phrase playback instruction on "L←R." The target device to be controlled by the operation instruction (the phrase number in the example in FIG. 13) which is selected based on the height range of the hand in the vertical direction is shown in the "VERTICAL" column, and the detection value range which corresponds with each height range is displayed in the "VALUE" column. The closer this detection value is to "99," the lower the height (i.e., the closer the object is to the panel face); while the closer it is to "0," the higher the height from the panel face.

Figure 8:
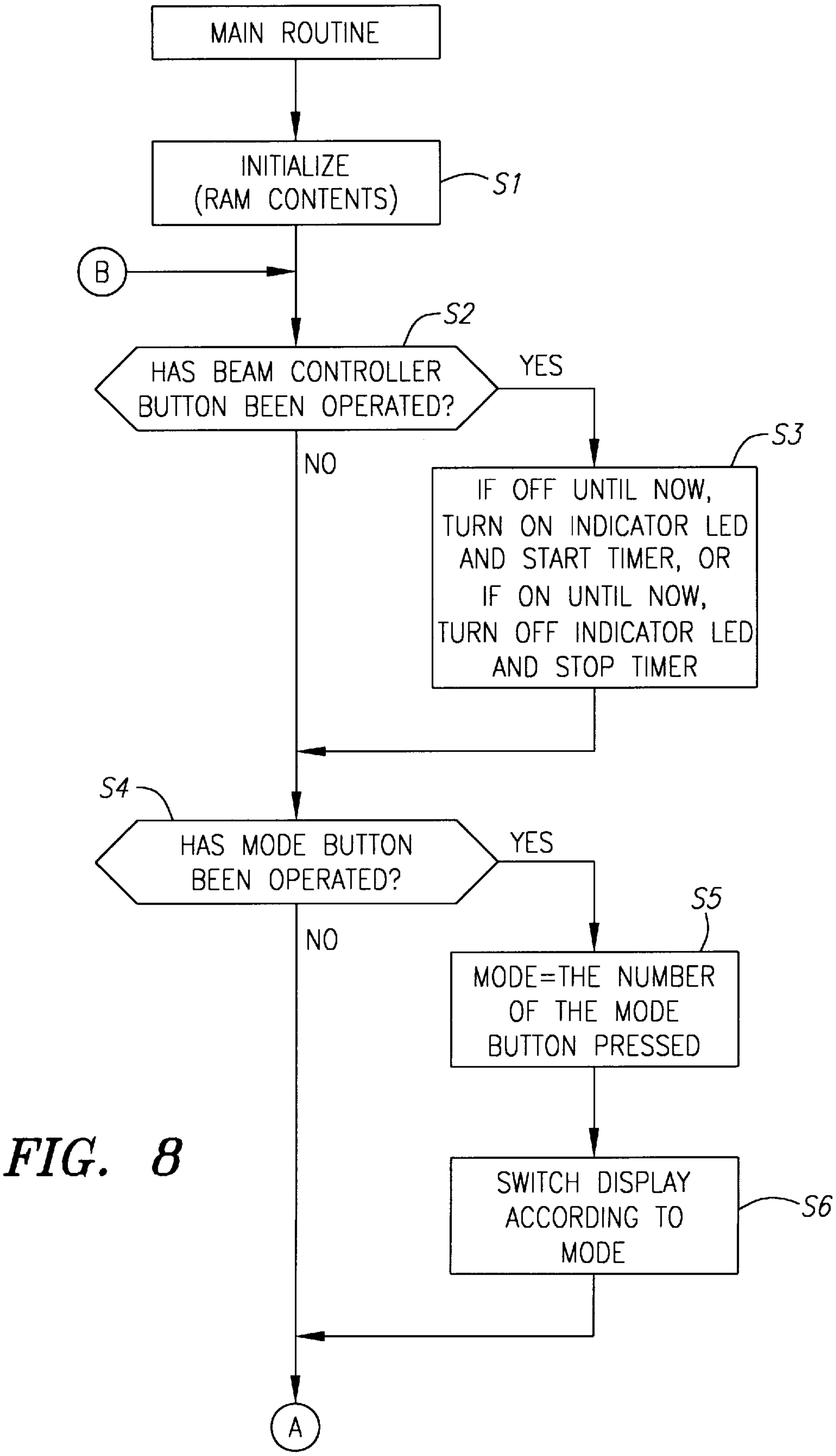
FIG. 8 is part one of a two-part flow chart of the main routine in the device of the embodiment of FIG. 1.
Figure 9:
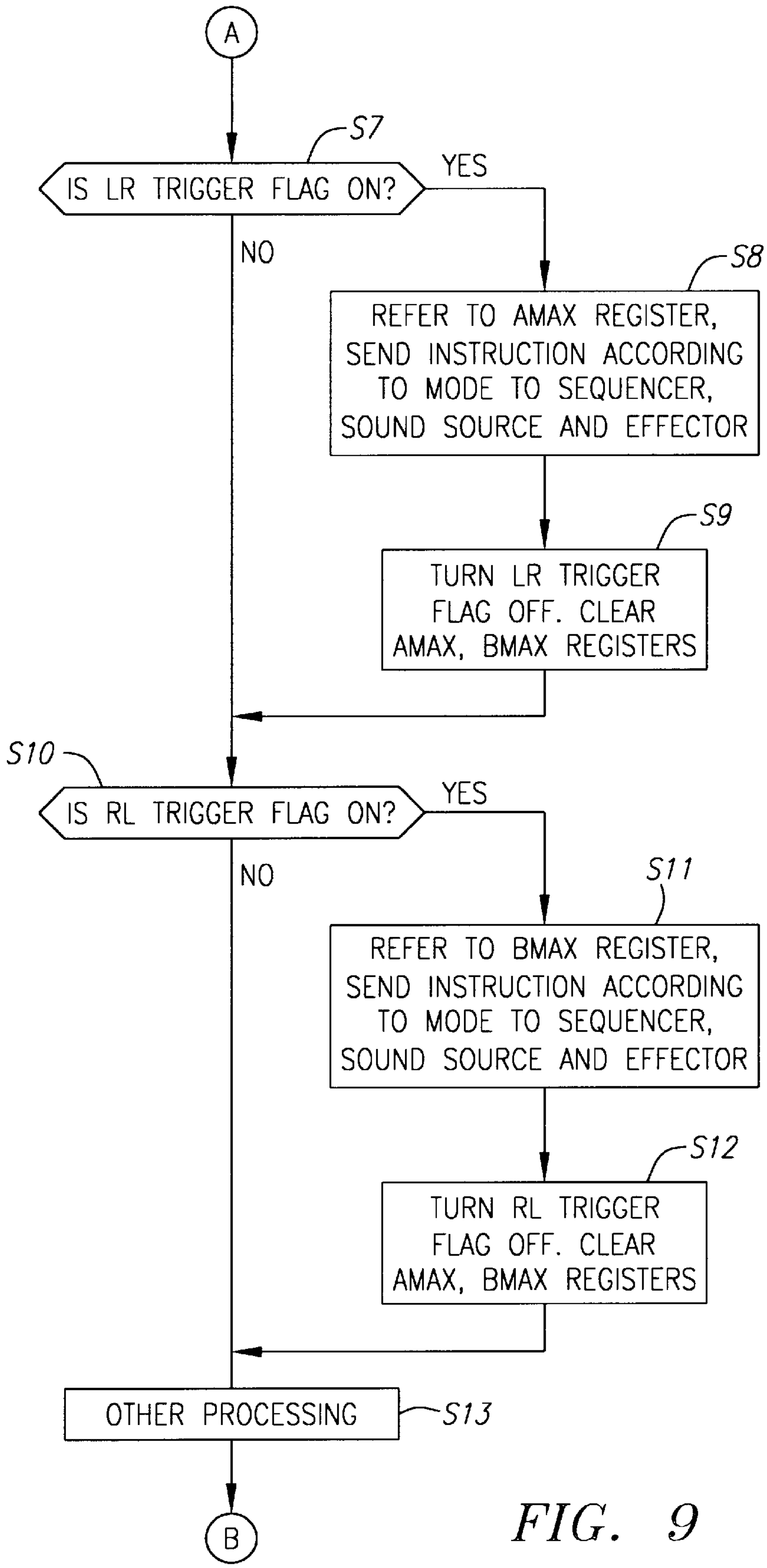
FIG. 9 is part two of a two-part flow chart of the main routine in the device of the embodiment of FIG. 1.
Figure 10:
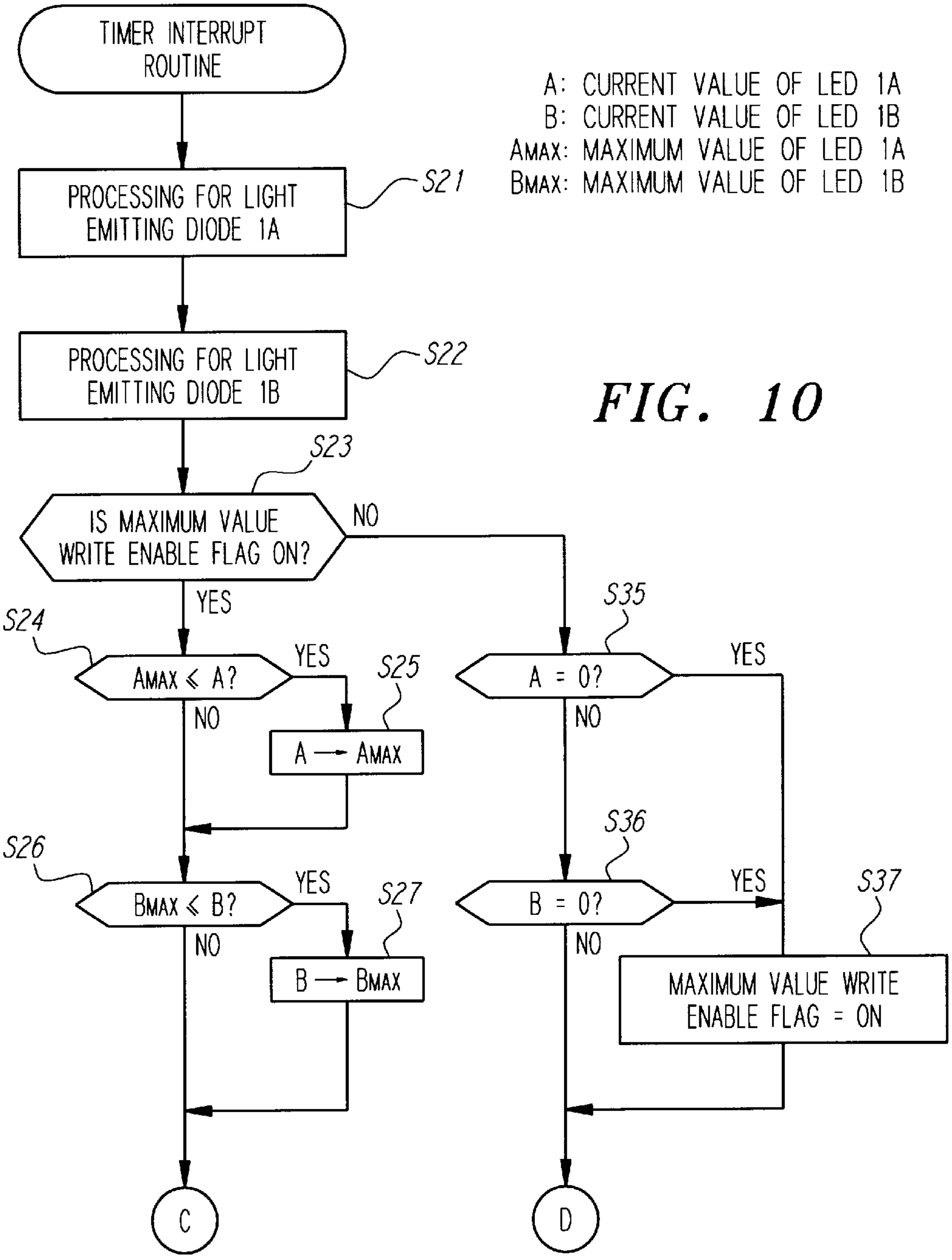
FIG. 10 is part one of a two-part flow chart of the timer interrupt routine in the device of the embodiment of FIG. 1.
Figure 11:
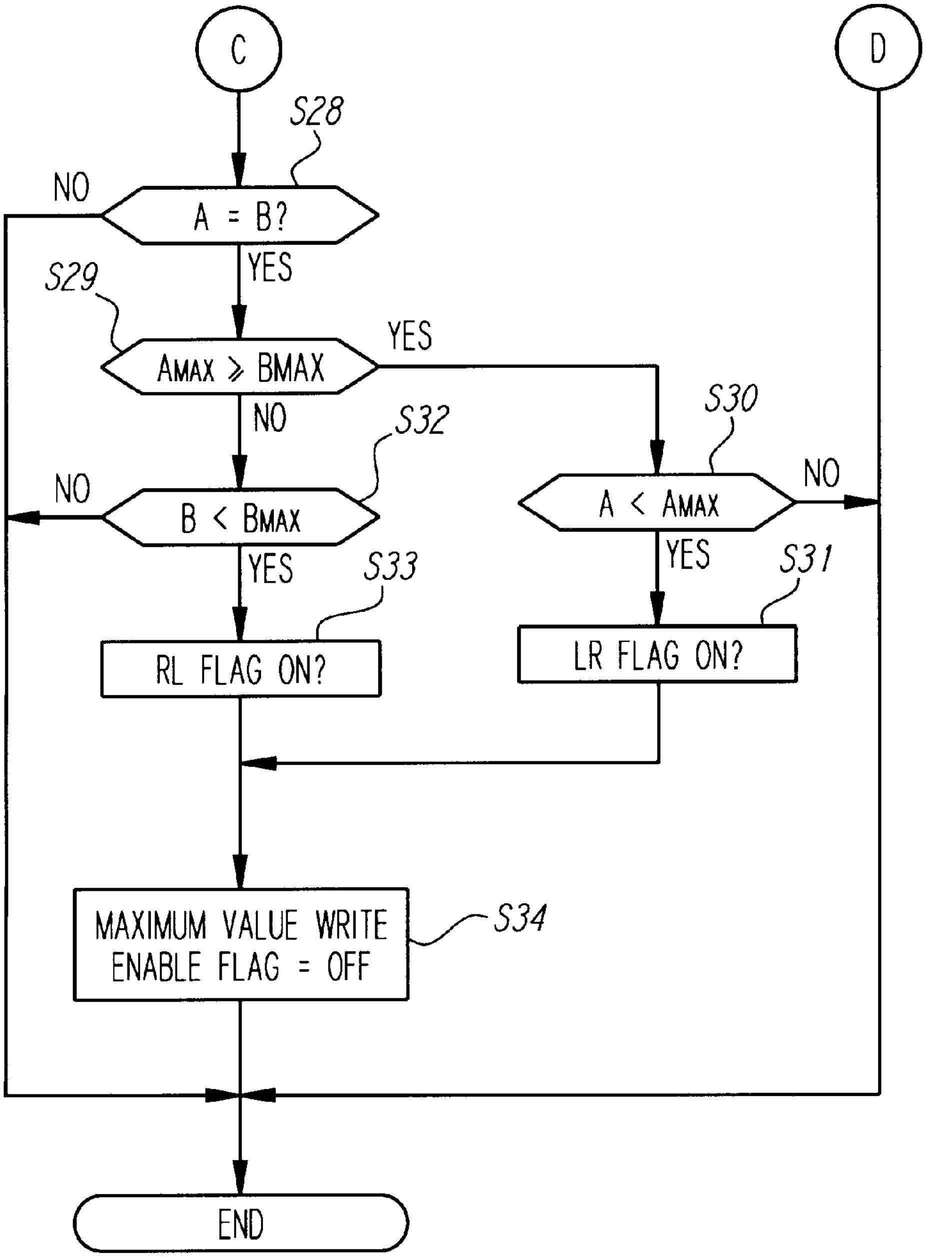
FIG. 11 is part two of a two-part flow chart of the timer interrupt routine in the device of the embodiment of FIG. 1.

The operation of the device of this example embodiment will be explained below, referring to the flow charts in FIG. 8 through FIG. 12. FIG. 8 and FIG. 9 are the flow charts for the main routine. FIG. 10 and FIG. 11 are flowcharts for the timer interrupt routine which is executed every time an interrupt is sent from the timer 10 to the CPU 3, that is, every 5 milliseconds. In addition, FIG. 12 is the processing flow chart for the light emitting diodes.

First, the timer interrupt processing routine shown in FIG. 10 and FIG. 11 will be explained. This timer interrupt routine sequentially detects the detection values RA, RB corresponding to the light emitting diodes 1A, 1B, and then performs update processing for the maximum values Amax, Bmax of the detection values, performs ON/OFF processing for the LR trigger flag and RL trigger flag, and performs ON/OFF processing for the maximum value write enable flag based on these detection values.

When the timer interrupt processing routine is started, the processing pertaining to light emitting diode 1A is performed (step S21) first. The flow chart of this processing is shown in FIG. 12. The light emitting diode 1A is caused to emit light (step S41), the current detection value RA detected by the infrared sensor 2 (i.e., the detection value corresponding to the light reflected from the object pertinent to light emitting diode 1A) is stored in the A register as the current value A (step S42), and the light emitting diode 1A is turned off (step S43). Once the processing pertinent to light emitting diode 1A is completed, similar processing is performed for light emitting diode 1B (step S22). Thus, the light emission timing for the light emitting diodes 1A, 1B is alternated, making it possible to obtain the detection values RA, RB from these light emitting diodes 1A, 1B in a time multiplexed manner.

Once current values A, B are obtained, it is determined whether the maximum value write enable flag is ON or OFF (step S23). Since it is possible to update the maximum values Amax and Bmax if the flag is ON, it is determined first whether the current value A is greater than the maximum value Amax (step S24). If the current value A is greater than the maximum value Amax, the maximum value Amax is updated by being replaced with the current value A (step S25). If the current value A is less than the maximum value Amax, the maximum value Amax has already reached its peak value, so it is not updated. It is then determined whether or not the current value B is greater than the maximum value Bmax (step S26). If it is greater than the maximum value Bmax, the maximum value Bmax is updated by being replaced with the current value B (step S27); while if the current value B is less than the maximum value Bmax, the maximum value Bmax is not updated.

Next, it is determined whether or not the two current values A, B are equal (step S28). If the two current values A, B are equal, it means that the object (e.g., a hand) is at the lateral mid-way position (in the vicinity of directly above the infrared sensor 2), as can be understood from the characteristic diagram in FIG. 5. In this case, the greater-than/less-than relationship between the maximum values Amax and Bmax is determined (step S29). If Amax≧Bmax, it can be conjectured that the object has reached the mid-way position moving from left to right (Amax>Bmax), or that it has been moved vertically in the vicinity of the mid-way position (Amax=Bmax). On the other hand, if Amax<Bmax, it can be conjectured that the object was moved from right to left. If Amax≧Bmax, it is determined whether or not the current value A is less than the maximum value Amax (step 30). Since this determination indicates whether the current value A is still increasing or if it has entered a declining stage, it is possible to determine whether or not the current maximum value Amax is the peak value (apex of the hill) of the characteristic for the current value A. If the current maximum value Amax is the peak value, it can be ascertained that the object has reached the mid-way position moving from left to right, and consequently, the LR trigger flag is set to ON (step 31). On the other hand, if the maximum value Amax is not the peak value, the timer interrupt routine is completed for now, so that the maximum value Amax can be further updated in a subsequent iteration.

If Amax<Bmax in step S29, similar comparison processing is performed for detection value B and maximum value Bmax (step S32). If the maximum value Bmax is the peak value, it is ascertained that the object has reached the lateral mid-point moving from right to left and the RL trigger flag is set to ON (step S33).

Once the LR trigger flag or the RL trigger flag has been set to ON, the maximum value write enable flag is turned OFF so that the maximum values Amax, Bmax cannot be overwritten and the maximum values Amax, Bmax determined to be the peak values will not be altered (step S34). When the LR trigger flag or the RL trigger flag is turned ON, a start phrase performance instruction or the like will be triggered, as will be described below. However, situations also arise where the current value A, B increases immediately after this trigger because the motion of the hand has been changed, so that a new maximum value is written to the Amax register or Bmax register. In this situation, since it is impossible for a phrase whose "VALUE" is small (equivalent to the first phrase) to be selected as the target of control when the next operation instruction is performed, the maximum value write enable flag is turned OFF after a trigger so that the maximum value cannot be updated until the current value A or B is below a specified value.

Consequently, when the maximum value write enable flag is OFF at step S23, there can be a case in which the hand which was above the beam control has passed the lateral mid-point position (i.e., the trigger has been activated), and in which case, when the current value A or B reaches "0" (step S35, S36), it can be judged that the hand has exited the operation space and this hand-activated operation instruction is completed, in which case, in preparation for the next operation instruction, the maximum value write enable flag which had been turned OFF is again set to ON (step S37), and the timer interrupt routine is completed.

Figure 7:
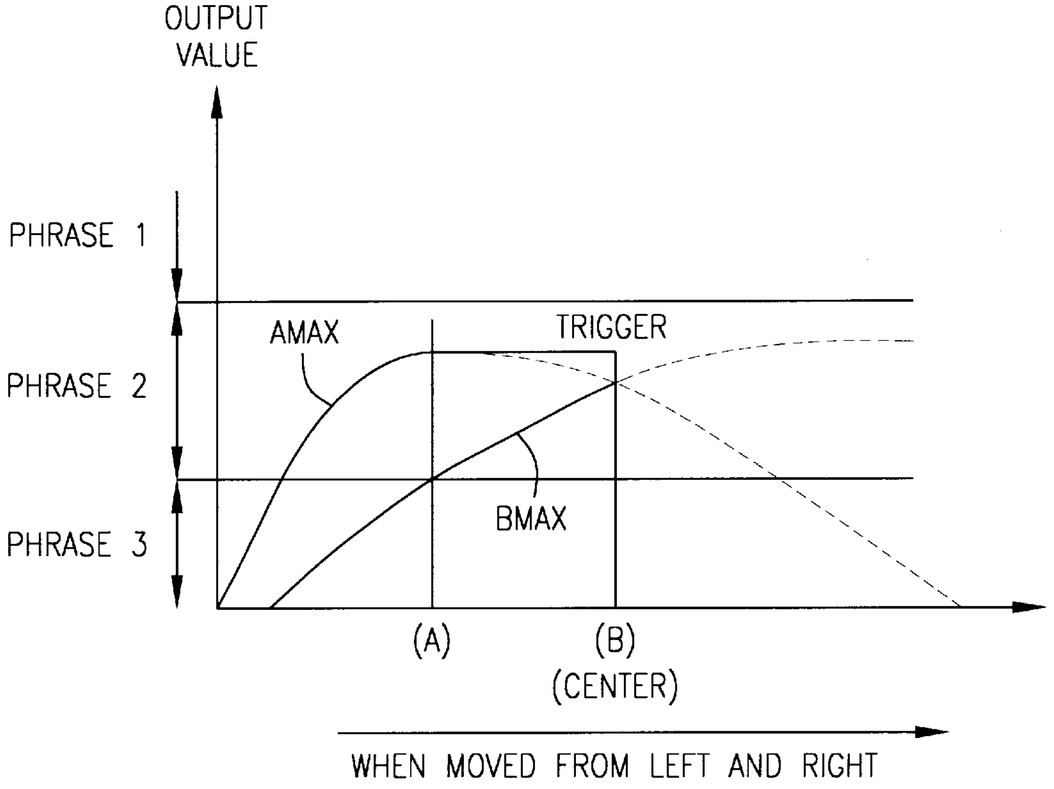
FIG. 7 is a drawing showing the characteristics of the values stored in the Amax register and the Bmax register when an object has passed over the sensor in the horizontal direction in the device of the embodiment of FIG. 1.

Since the maximum values (peaks) of the respective current values A, B (=detection value RA, detection value RB) are thus stored in the Amax register and Bmax register in the RAM 5 by this timer interrupt routine, when an object is moved, e.g., from left to right, the value in the Amax register will not change from the position (a), as the Amax register and Bmax register are shown in FIG. 7. When the object reaches the mid-point (directly above the infrared sensor) and current value A and current value B reach the same value (position (b) in the figure), the amplitudes of the Amax register and the Bmax register are compared, and processing is performed selecting the control target with corresponds with the value of the larger value at this time (in this case the peak value in the Amax register) (when Mode=1, as will be discussed below, "Stop Phrase 2" processing). When the instruction to execute processing is given, the Amax register and Bmax register are cleared to "0," but writing to the Amax register and Bmax register is prohibited until the current value A and current value B reach "0."

Next, the main routine shown in FIG. 8 and FIG. 9 will be explained. When the power is turned ON in the device in this example embodiment, first the various registers and flags described above in RAM 5 are initialized (step S1). Next, it is determined whether or not the beam controller button 61 has been pressed (step S2), and if it has been pressed, the resulting alternative operation is performed. If it had been OFF until now and is switched to ON, the indicator light emitting diode 611 is lit and the timer 10 for impressing timer interrupts is started. On the other hand, if the button had been ON until now and is switched to OFF, the indicator light emitting diode 611 is doused and the timer 10 is stopped (step S3).

It is then determined whether any of the MODE buttons $65_1$~$65_7$ has been pressed (step S4), and if one has been pressed, the mode number corresponding to the MODE button which had been pressed is written to the MODE register (step S5), and display switching is performed so that the display screen corresponding with the mode number which has been written to the MODE register is displayed on the display 66 (step S6).

Next, it is determined whether or not the LR trigger flag is ON (step S7), and if it is ON, it is deemed that a hand has crossed from left to right, in which case, the maximum value Amax in the Amax register (peak value) is referred to, and the operation instruction under "L→R" which corresponds with that mode and the control target information corresponding with the maximum value Amax are sent to the target device (e.g., sequencer, sound source, effecter, etc.) (step S8). Then, the LR trigger flag is turned OFF and the Amax register and Bmax register are cleared to "0" (step S9). If the LR trigger flag is OFF, it is determined whether or not the RL trigger flag is ON (step S10), and if it is ON, it is deemed that a hand has crossed from right to left, in which case, the maximum value Bmax in the Bmax register (peak value) is referred to, and the operation instruction which corresponds with that mode and the control target information corresponding with the maximum value Amax are sent to the target device (e.g., sequencer, sound source, effecter, etc.) (step S11), the RL trigger flag is turned OFF, and the Amax register and Bmax register are cleared to "0" (step S12). Next, any other necessary processing is performed (step S13) and the preceding processing is looped and repeated (S2~S13).

Now, as this "other necessary processing," prior to the trigger processing corresponding to the LR trigger flag or RL trigger flag being ON, the control target items displayed under "VERTICAL" may be changed to a display status which reflects the operation instruction control target items which will be performed by said trigger processing (e.g., said items are made brighter, or reversed back/foreground highlighted, etc.) could be performed. In other words, it is determined into which range of "VALUE" the greater of the values in the Amax register and Bmax register falls, and the display status of the items listed under "VERTICAL" is changed and displayed based on that determination. By doing this, the operator can know upon which control target the upcoming operation instruction will be performed before the operation instruction is executed (before the trigger is activated at the lateral mid-way position), preventing the wrong processing from being executed during a performance.

Detailed concrete examples of Modes 1~7 will be described below.

Mode 1

The display screen for Mode 1 is shown in FIG. 13. This Mode 1 is a mode for giving operation instructions to control the sequencer.

When an object is moved over the beam controller from right to left, at the time that the object has passed over the lateral mid-point, the phrase corresponding to the maximum value Bmax at that time (peak value) is triggered (performance is started). On the other hand, when an object is moved over the beam controller from left to right, at the time that the object has passed over the lateral mid-point, performance of the phrase corresponding to the maximum value Amax at that time (peak value) is stopped.

In the display screen, the operation instruction content "STOP" for when a left to right operation is performed is displayed under "L→R," while the operation instruction content "TRIGGER" for when a right to left operation is performed is displayed under "L←R." The numbers of the phrases that will be triggered/stopped according to the vertical height of the object are displayed in the "VERTICAL" column, while the settings for the peak value ranges for the control thereof are displayed in the "VALUE" column, as, e.g., "0~33."

When a trigger instruction is issued in response to a right to left movement of the object, the peak value in the Bmax register is referred to and an instruction to start playback of the corresponding phrase is sent to the sequencer 7 by the CPU 3. When a stop instruction is issued in response to a left to right movement of the object, the peak value in the Amax register is referred to and a stop playback instruction for the corresponding phrase is sent to the sequencer 7 by the CPU 3.

Mode 2

The display screen for Mode 2 is shown in FIG. 14. This Mode 2 also is a mode for giving operation instructions to control the sequencer.

When an object is moved over the beam controller from right to left, at the time that the object has passed over the lateral mid-point, the phrase corresponding to the peak value in the Bmax register is "one-shot" triggered so that it is performed only once. On the other hand, when an object is moved over the beam controller from left to right, at the time that the object has passed over the lateral mid-point, the phrase corresponding to the peak value in the Amax register is "loop" triggered so that it is repeatedly played. Furthermore, if an object is moved over the beam controller from left to right after a phrase has been triggered in a loop, at the time that the object has passed over the lateral mid-point, looped playback of the phrase corresponding to the peak value in the Amax register is stopped.

In the display screen, the operation instruction content "LOOP TRIGGER/LOOP STOP" for when a left to right operation is performed is displayed under "L→R," while the operation instruction content "ONE SHOT TRIGGER" for when a right to left operation is performed is displayed under "L←R." The numbers of the phrases that will be triggered/stopped according to the vertical height of the object are displayed in the "VERTICAL" column, while the settings for the peak value ranges for the control thereof are displayed in the "VALUE" column, as, e.g., "0~33."

When a trigger instruction is issued in response to a right to left movement, the peak value in the Bmax register is referred to and an instruction to start one-shot playback (for playback one time only) of the corresponding phrase is sent to the sequencer 7 by the CPU 3. When a trigger instruction is issued in response to a left to right movement, the peak value in the Amax register is referred to and a loop playback instruction for the corresponding phrase is sent to the sequencer 7 by the CPU 3. At this time, if the corresponding phrase is already in loop playback (being played repeatedly), an instruction to stop loop playback will be sent.

Mode 3

The display screen for Mode 3 is shown in FIG. 15. This Mode 3 is a mode for giving operation instructions to control the sequencer and effecter.

When an object is moved over the beam controller from right to left, at the time that the object has passed over the lateral mid-point, the phrase corresponding to the peak value in the Bmax register is triggered and playback is started with the effect "ON." In addition, if an object is moved over the beam controller from left to right, at the time that the object has passed over the lateral mid-point, the phrase corresponding to the peak value in the Amax register is triggered with the effect "OFF." At this time, an instruction to turn the effect switch "ON/OFF" is given to the effecter 9 which corresponds with the type of effect recorded in the phrase data.

In the display screen, the operation instruction content "EFFECT ON+TRIGGER" for when a left to right operation is performed is displayed under "L→R," while the operation instruction content "EFFECT OFF+TRIGGER" for when a right to left operation is performed is displayed under "L←R." The numbers of the phrases that will be triggered/stopped according to the vertical height of the object are displayed in the "VERTICAL" column, while the settings for the peak value ranges for the control thereof are displayed in the "VALUE" column, as, e.g., "0~33." In addition, the types of effects which correspond to the three phrases stored in PHRASE in RAM are displayed as "CHORUS/REVERSE/EQ" in the "EFFECT TYPE" column at the very bottom of the screen.

When a trigger instruction is issued in response to a right to left movement, the peak value in the Bmax register is referred to and an instruction to play back the corresponding phrase is sent to the sequencer 7 by the CPU 3 and an instruction to apply the type of effect corresponding with said phrase is sent to the effecter 9 by the CPU 3. When a trigger instruction is issued in response to a left to right movement, the peak value in the Amax register is referred to and an instruction to play back the corresponding phrase is sent to the sequencer 7 by the CPU 3. At this time, no effect is applied to that phrase.

Mode 4

The display screen for Mode 4 is shown in FIG. 16. This Mode 4 is a mode for giving operation instructions to control the sequencer 7.

When an object is moved over the beam controller from right to left, at the time that the object has passed over the lateral mid-point, the phrases stored in PHRASE1–PHRASE3 in RAM 5 are triggered in order. In other words, if this operation is performed, e.g., after PHRASE1 has been played back, PHRASE2 will be played back. Essentially, it is a "play back the next phrase" instruction. As for the volume of the phrase being played back at this time, the phrase is played back at the volume which corresponds with the peak value in the Bmax register. In addition, if an object is moved over the beam controller from left to right, at the time that the object has passed over the lateral mid-point, the phrases stored in RAM 5 are triggered in reverse order. For instance, if this operation is performed, e.g., after PHRASE3 has been played back, PHRASE2 will be played back. Essentially, it is a "play back the previous phrase" instruction. As for the volume of the phrase being played back at this time, the phrase is played back at the volume which corresponds with the peak value in the Amax register.

In the display screen, the operation instruction content "PREVIOUS PHRASE TRIGGER" for when a left to right operation is performed is displayed under "L→R," while the operation instruction content "NEXT PHRASE TRIGGER" for when a right to left operation is performed is displayed under "L←R." "VOLUME CONTROL" is displayed in the "VERTICAL" column, indicating that the phrases will be triggered at a volume corresponding to the vertical height.

When a trigger instruction is issued for the first time by a right to left operation, the peak value in the Bmax register is referred to and an instruction to playback the initial phrase stored in the RAM 5 at the corresponding volume is sent to the sequencer 7 by the CPU 3. A pointer is set at the phrase being played back, and if triggered once more from the right the pointer will move to the next phrase, the peak value in the Bmax register is referred to, and an instruction to playback the next phrase at the corresponding volume is sent to the sequencer 7 by the CPU 3.

In addition, when a trigger instruction is issued in response to a left to right movement, the peak value in the Amax register is referred to and an instruction is sent to the sequencer 7 to move the corresponding pointer to the immediately previous phrase, and then the Amax register is referred to and the previously triggered phrase is played back at the corresponding volume.

In this particular version of Mode 4, the volume is controlled based on the vertical height, but it is not limited to this. For example, pan pot or tempo instructions corresponding to the vertical height could be sent to the sequencer 7.

Mode 5

The display screen for Mode 5 is shown in FIG. 17. This Mode 5 is a mode for giving operation instructions to control the sequencer 7.

When an object is moved over the beam controller from right to left, at the time that the object has passed over the lateral mid-point, the phrase corresponding to the peak value in the Bmax register is triggered. Said phrase is triggered and playback is started whether or not there is another phrase or song data currently being played back by the sequencer 7. On the other hand, when an object is moved over the beam controller from left to right, at the time that the object has passed over the lateral mid-point, the phrase corresponding to the peak value in the Amax register is triggered. At this time, if song data is currently being played back by the sequencer, performance of the song by the sequencer 7 is muted and the phrase is triggered. If performance of a song by the sequencer 7 has already been muted at this time, that mute is canceled.

In the display screen, the operation instruction content "SEQUENCER MUTE ON-TRIGGER/SEQUENCER MUTE OFF" for when a left to right operation is performed is displayed under "L→R," while the operation instruction content "TRIGGER" for when a right to left operation is performed is displayed under "L←R." The numbers of the phrases that will be triggered according to the vertical height of the object are displayed in the "VERTICAL" column, while the settings for the peak value ranges for the control thereof are displayed in the "VALUE" column, as, e.g., "0–33."

When a trigger instruction is issued in response to a right to left operation, the peak value in the Bmax register is referred to and an instruction to start playback of the corresponding phrase is sent to the sequencer 7 by the CPU 3. When a trigger instruction is issued in response to a left to right operation, the peak value in the Amax register is referred to and an instruction to start playback of the corresponding phrase is sent to the sequencer 7 by the CPU 3, and an instruction is sent to the sequencer 7 by the CPU 3 to mute the performance of song data which was being performed by the sequencer 7. At this time, if song data on the sequencer 7 has already been muted, an instruction is sent to the sequencer 7 to cancel the mute. Consequently, if there is no song data being played back by the sequencer 7, the phrase will be triggered the same whether the operation is from the left or the right.

Mode 6

The display screen for Mode 6 is shown in FIG. 18. This Mode 6 is a mode for giving operation instructions to control only the sound source 8.

Assume that the voices which can be played by the sound source 8 are 0 set in groups, follows.

| Group No. | Group Name | Voice No. | Voice Name |
|---|---|---|---|
| 1 | Piano | 1 | Piano 1 |
| 1 | Piano | 2 | Piano 2 |
| 1 | Piano | 3 | Honky-tonk |
| 2 | Bass | 1 | Picked bass |
| 2 | Bass | 2 | Acoustic bass |
| 2 | Bass | 3 | Fretless bass |
| 3 | Guitar | 1 | Clean guitar |
| 3 | Guitar | 2 | Nylon guitar |
| 3 | Guitar | 3 | Distortion guitar |
| . | ... | . | ..... |
| . | ... | . | ..... |

The sound source 8 will generate musical tones according to these voice group members and voice numbers which are sent from the CPU 3.

When an object is moved over the beam controller from right to left, at the time that the object has passed over the lateral mid-point, if the peak value in the Bmax register= 0–50, voice group number is incremented according to the peak value, and if the peak value=51–99, the voice number will be incremented according to the peak value. In addition, when an object is moved over the beam controller from left to right, at the time that the object has passed over the lateral mid-point, the voice group number or voice number will be decremented according to the peak value in the Amax register.

In the display screen, the operation instruction content "DECREMENT" for when a left to right operation is performed is displayed under "L→R," while the operation instruction content "INCREMENT" for when a right to left operation is performed is displayed under "L←R." The "VERTICAL" column displays the voice group number or the voice number that the operator can select to be sent to the sound source 8 according to the vertical height of the object. The peak value ranges for making these selections are displayed in the "VALUE" column, as, e.g., "0–50."

When a trigger instruction is issued in response to a right to left operation, the peak value in the Bmax register is referred to and an instruction to increment either the voice group number or the voice number is sent to the sound source 8 by the CPU 3. When a trigger instruction is issued in response to a left to right operation, the peak value in the Amax register is referred to and an instruction is sent to the sound source 8 by the CPU 3 to decrement either the voice group number or the voice number.

This Mode 6 operates to switch the voice of the sound source 8, but it is not limited to this. For example, it could be applied to switch any of the parameters related to the sound source 8.

In addition, the sequencer 7 also could be controlled instead of the sound source 8, so that the phrase recorded in the sequencer ROM 71 can be selected by incrementing/decrementing the phrase number. In other words, the 100 phrases recorded in the sequencer ROM 71 could be divided by categories and a category number assigned to each, and phrase numbers could be assigned to each of the phrases included in each category number. By substituting the voice groups in Mode 6 described above with phrase category numbers and the voice numbers with phrase numbers, those category numbers or phrase numbers could be incremented/decremented according to the right to left operation or left to right operation of the object.

Mode 7

The display screen for Mode 7 is shown in FIG. 19. This Mode 7 is a mode for giving operation instructions to control the effecter 9.

The effecter 9 is equipped with multiple effect patches which consist of combinations of three types of effects. The effect patches which will be actuated can be selected using the other operation elements 64 in FIG. 2.

When an object is moved over the beam controller from right to left, at the time that the object has passed over the lateral mid-point, the effect corresponding to the peak value in the Bmax register is turned ON. When an object is moved over the beam controller from left to right, at the time that the object has passed over the lateral mid-point, the effect corresponding to the peak value in the Amax register is turned OFF.

In the display screen, the operation instruction to turn the effect "ON" when a left to right operation is performed is displayed under "L→R," while the operation instruction content to turn the effect "OFF" when a right to left operation is performed is displayed under "L←R." The three types of effects in the effects patches (in this example, wow, distortion, and reverb) are displayed from top to bottom in the "VERTICAL" column, while the peak value ranges for selecting the type of effect on which to perform said ON/OFF control are displayed in the "VALUE" column, as, e.g., "0~33." The three types of effects under the "VERTICAL" column are set by the various other operation elements 64 and are stored in a register in the RAM 5, which is not shown.

When a trigger instruction is issued in response to a right to left operation, the peak value in the Bmax register is referred to and an instruction to turn ON corresponding effect is sent to the effecter 9 by the CPU 3. When a trigger instruction is issued in response to a left to right operation, the peak value in the Amax register is referred to and an instruction is sent to the effecter 9 by the CPU 3 to turn OFF the corresponding effect.

While this Mode 7 operates to switch the type of effect, but it is not limited to this. For example, any of the parameters related to the effecter 9 could be controlled by a similar method.

A variety of modes, similar to those in Mode 8 through Mode 10 described below, are also possible in the device of this example embodiment. These will be described below without referencing figures.

Mode 8: Sequencer Control+Sound Source Control

This Mode 8 is a mode for performing operation instructions for the control of the sequencer 7 and the sound source 8.

When an object is moved over the beam controller from right to left, at the time that the object has passed over the lateral mid-point, the phrase corresponding to the peak value in the Bmax register is triggered, after which, the degree to which modulation and/or pitch bends is applied corresponds to the detection value RA and detection RB (=current value A, B) of the infrared sensor 2. If the value for the detection value RA or detection value RB is equal to or greater than 100, said control is canceled. In addition, when an object is moved over the beam controller from left to right, at the time that the object has passed over the lateral mid-point, the phrase corresponding to the peak value in the Amax register is simply triggered, in which case, modulation and/or pitch bend control is not performed by the movement of the object.

In the display screen, the operation instruction content "TRIGGER/CONTROL ON" for when a left to right operation is performed is displayed under "L←R," while the operation instruction content "TRIGGER+CONTROL OFF" for when a right to left operation is performed is displayed under "L←R." The numbers of the phrases that will be triggered according to the vertical height of the object are displayed in the "VERTICAL" column, while the peak value ranges for the selection thereof are displayed in the "VALUE" column, as, e.g., "0~33."

In this Mode 8, once a phrase is triggered, the parameter name that controls the phrase selected in "VERTICAL" is displayed at the very bottom of the screen, as, e.g., "CONTROL=MODULATION," etc.

Mode 9: Sound Source Control

This Mode 9 is a mode for performing operation instructions for the control of the sound source 8. The sound source 8 is a sound source which is equipped with filters.

When an object is moved over the beam controller from right to left, after the object has passed over the lateral mid-point, the filter resonance can be variably controlled by the value which corresponds to current detection value RA, detection value RB of the infrared sensor 2 (after passing over the lateral mid-point). In addition, when an object is moved over the beam controller from left to right, after the object has passed over the lateral mid-point, the filter cut-off can be variably controlled by the value which corresponds to current detection value RA, detection value RB of the infrared sensor 2. If the value for the detection value RA or detection value RB is equal to or greater than 100, said filter control is canceled.

In the display screen, the parameter name “RESONANCE” which is controlled when a left to right operation is performed is displayed under “L→R,” while parameter name “CUT-OFF” which is controlled when a right to left operation is performed is displayed under “L←R.” “SEQUENTIAL CONTROL” is displayed in the “VERTICAL” column, indicating that the aforementioned parameters are being continuously, variably controlled by vertical movement of the object. The sound source parameters, “CUT-OFF,” etc., set under “L→R” and “L←R” may also be selected and set using other operation elements 64 on the panel.

Mode 10: Sound Source Control

This Mode 10 is a mode for performing operation instructions for the control of the sound source 8. The sound source 8 is a sound source which is equipped with an LFO (low-frequency oscillator).

When an object is moved over the beam controller from right to left, after the object has passed over the lateral mid-point, the LFO depth (amplitude) of the LFO can be variably controlled by the value which corresponds to current detection value RA, detection value RB of the infrared sensor 2. In addition, when an object is moved over the beam controller from left to right, after the object has passed over the lateral mid-point, the LFO rate (period) can be variably controlled by the value which corresponds to current detection value RA, detection value RB of the infrared sensor 2.

If the value for the detection value RA or detection value RB is equal to or greater than 100, the aforementioned control is canceled.

In the display screen, the parameter name “LFO DEPTH” which is controlled when a left to right operation is performed is displayed under “L→R,” while parameter name “LFO RATE” which is controlled when a right to left operation is performed is displayed under “L→R.” “SEQUENTIAL CONTROL” is displayed in the “VERTICAL” column, indicating that the aforementioned parameters are being continuously, variably controlled by vertical movement of the object.

In the device of the example embodiment described above, a desired operation instruction was performed when the detection value RA and detection value RB of the infrared sensor 2 were the same value, but the desired operation instruction could also be performed when the difference between detection value RA and detection value RB is within a specified range, or the desired operation instruction could be performed when the ratio of detection value RA to detection value RB is a specified ratio.

In addition, in the above example embodiments, a variety of controls are performed by detecting the vertical position of an object and from which direction the object reached the mid-point between two infrared LEDs. However, the velocity at which the object is moving could be detected and control could be based on the motion velocity. This velocity detection can be realized by monitoring the Amax register and the Bmax register and detecting the amount of time it takes from the point at which one or the other reaches its peak value to the point when the object reaches the mid-point.

As an application in this case, for example, a type of chord could be specified based on the height of the object. In addition, the sequence of generating the tones that comprise the chord could be specified as an up-stroke by a right to left operation, or a down-stroke tone generation sequence could be specified by a left to right operation. Furthermore, the timing and velocity at which the tones that comprise the chord are generated could be specified based on the velocity of the object. In this specification of timing and velocity, if the velocity is fast, the remaining tones that are generated after the initial constituent tone has been sounded would be generated at a rapid timing and at a high volume. If the velocity is slow, the remaining tones that are generated after the initial constituent tone has been sounded would be generated at a slow timing and at a low volume. The display screen for this case is displayed as shown in FIG. 20.

In this method, if the apparatus is triggered by rapidly moving the object from right to left, the sounding timing of the constituent tones would be fast, and they would be generated in a down stroke at high volume. On the other hand, if the apparatus is triggered by slowly moving the object from left to right, the sounding timing of the constituent tones would be slow, and they would be generated in an up stroke at low volume. This could be used to simulate the cutting technique on a guitar.

A variety of other modifications are also possible in implementing this invention. For instance, the lateral movement of an object was detected in the example embodiment described above using two infrared light emitting diodes 1A, 1B and one infrared sensor 2, and the content of the operation instruction was changed depending on whether the object was moved from right to left or whether it was moved from left to right. However, if different processing is performed based only on the peak value produced by the movement of the object inside the space (i.e., its height), the example embodiment described above could be simplified and control could be performed with only one infrared light emitting diode and one infrared sensor.

Namely, the beam irradiation direction of the infrared light emitting diode 1A in the device of the example embodiments described above would be made plumb to the panel surface, the light receiving surface of the infrared sensor 2 would be situated with the same orientation as above, and the infrared light emitting diode 1B would be eliminated. In this case, the light emitting diode 1A would be continuously lit, not at time intervals. The detection value RA would be detected at every specified time period and, when the detection value RA is increasing, the detection value RA would be stored as a maximum value in the Amax register, and if the detection value RA starts to decrease, the value in the Amax register would be the peak value and the specified processing corresponding with the amplitude of said peak value would be executed. Now, this kind of peak value would occur when the object was moved horizontally from the left or right and then passed directly over the infrared sensor, or returned mid-way in the opposite direction, or when the object was being moved downward from above and then returned mid-way in the upward direction.

In this case, the following registers and flags would be set in the RAM 5.

A register: Stores the current detection value RA from the light emitting diode 1A as the current value A.

Amax register: Stores the maximum value RA up to the present of the current value A.

Trigger flag: Indicates to execute processing when ON.

Maximum value write enable flag: Allows writing of the maximum value when ON. Once execution of processing has been indicated, the next processing will not be performed because the maximum value write enable flag is turned “OFF” until the detection value RA reaches “0.”

In addition, the following four modes—Mode 11 through Mode 14—can be set with the device of this example embodiment.

Mode 11: Sequencer Control

When the detection value RA has moved away from the maximum value (i.e., when the value in the Amax register has reached a peak value), an instruction to play back the phrase corresponding with that maximum value Amax is sent to the sequencer 7.

Mode 12: Sequencer Control

When the detection value RA has moved away from the maximum value (i.e., when the value in the Amax register has reached a peak value), an instruction to play back or stop playback of the song data corresponding with that maximum value Amax is sent to the sequencer 7.

Mode 13: Sound Source Control

When the detection value RA has moved away from the maximum value (i.e., when the value in the Amax register has reached a peak value), an instruction to switch to the voice corresponding with that maximum value Amax is sent to the sound source.

Mode 14: Effecter Control

When the detection value RA has moved away from the maximum value (i.e., when the value in the Amax register has reached a peak value), an instruction to switch to the type of effect corresponding with that maximum value Amax is sent to the effecter 9.

Figure 21:
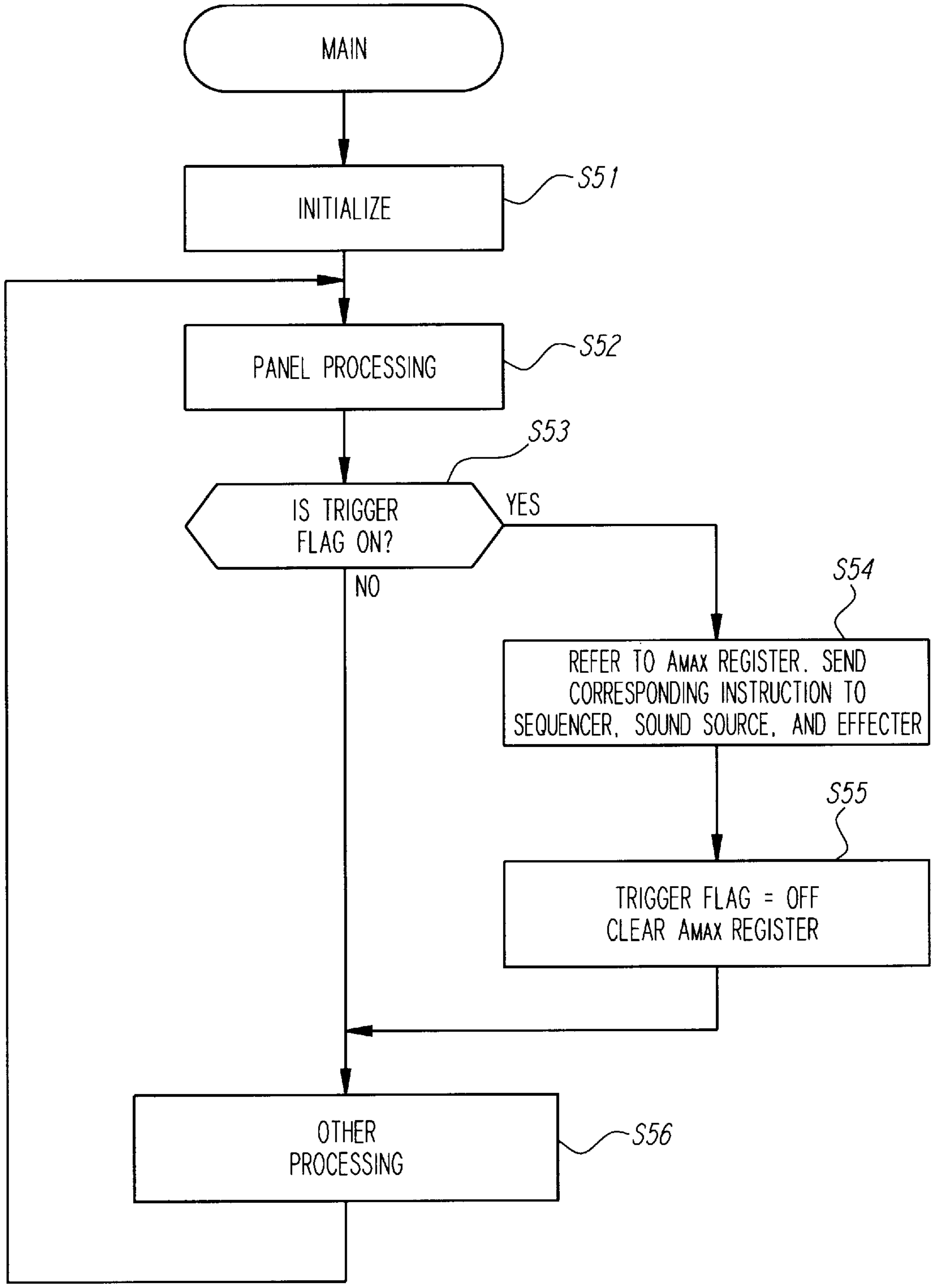
FIG. 21 is a flow chart showing the main routine in another example embodiment of the invention.
Figure 22:
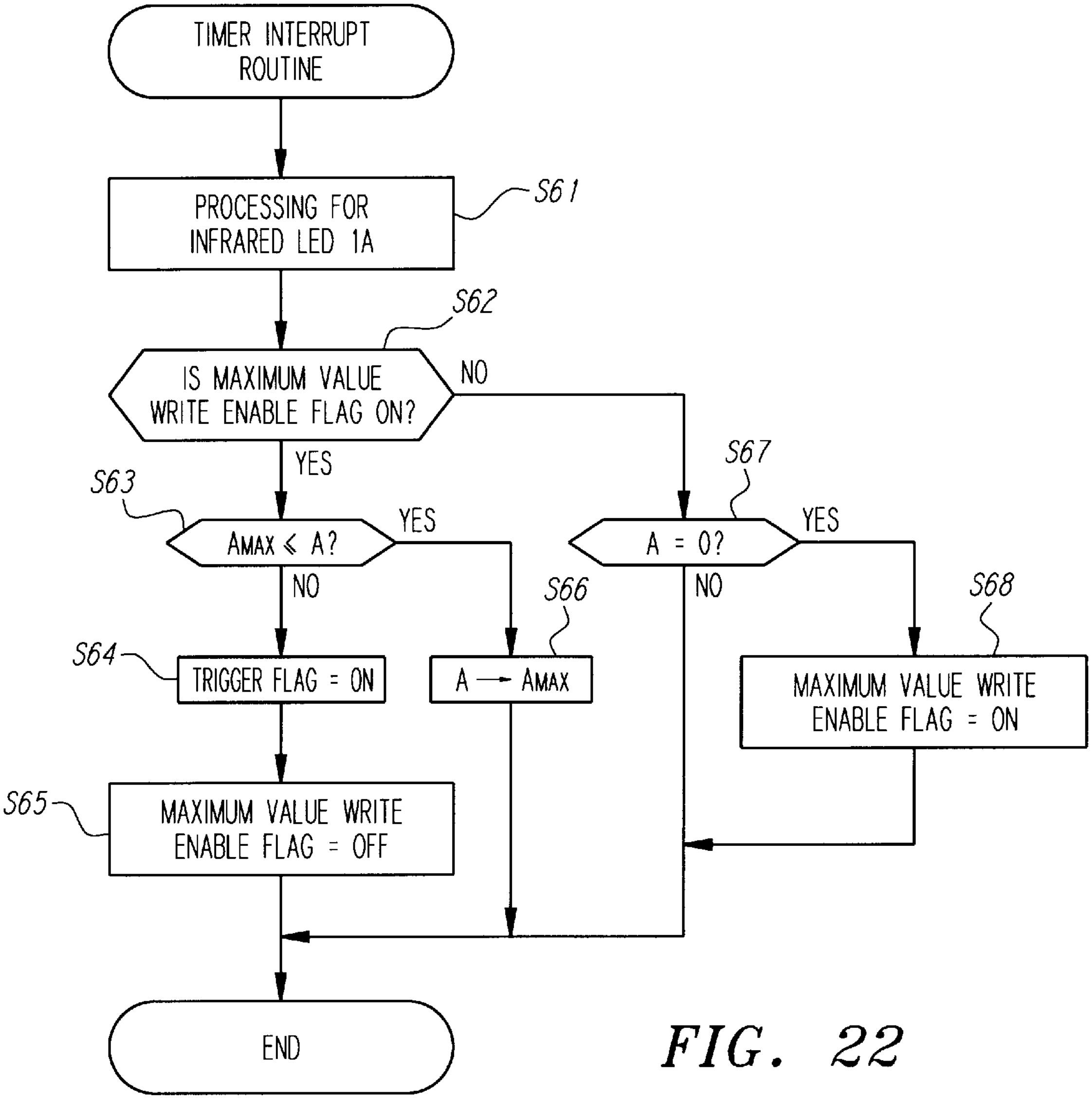
FIG. 22 is a flow chart showing the timer interrupt routine in another example embodiment of the invention.

The operation of the device of this example embodiment will be explained below, referring to the flow charts in FIG. 21 and FIG. 22. Here, FIG. 21 is a flow chart of the main routine. FIG. 22 is the timer interrupt routine, which is executed in response to an interrupt from the timer 10 to the CPU 3 every 5 milliseconds. First, the timer interrupt processing routine shown in FIG. 22 will be explained. This timer interrupt routine sequentially detects the detection value RA according to the light emitting diode 1A and then performs processing to update the maximum value Amax of the detection value, performs ON/OFF processing of the trigger flag, and/or performs ON/OFF processing of the maximum value write enable flag.

When the timer interrupt processing routine is started, processing pertaining to the light emitting diode 1A is first performed (step S61). This processing consists of processing to store the current detection value RA detected by the infrared sensor 2 in the A register as the current value A. Once the current value A has been obtained, it is determined whether the maximum value write enable flag is ON or OFF (step S62). Because it is possible to update the maximum value Amax if the flag is ON, it is determined whether or not the current value A is equal to or greater than the maximum value Amax (step S63). If it is equal to or greater than the maximum value Amax, that maximum value Amax is updated by being overwritten with the current value A (step S66). If the current value A is less than the maximum value Amax, that maximum value Amax is deemed to have reached the peak value and the trigger flag is turned "ON" (step S64). Once the trigger flag has been set to "ON", the maximum value write enable flag is turned OFF (step S65) so that the maximum value Amax detected as the peak value will not fluctuate and the maximum value Amax will not be overwritten. The reasons for turning the maximum value write enable flag OFF are the same as in the example embodiments described above.

If the maximum value write enable flag is OFF at step S62, it is determined whether or not the current operation instruction has been manually completed by the hand which had been placed over the beam controller exiting from the operating space by determining whether or not the current value A equals 0 (step S67). If the current operation instruction has been completed, the maximum value write enable flag which had been turned OFF is turned back ON (step S68) in preparation for the next operation instruction, completing the timer interrupt routine.

The main routine shown in FIG. 21 will be explained now. When the power is turned ON in the device of this example embodiment, the various aforementioned registers and flags provided in the RAM 5 are initialized first (step S51). Then the panel operations corresponding with steps S2~S6 in the example embodiments described above are performed (step S52). Next, it is determined whether or not the trigger flag is ON (step S53) and if it is ON, the maximum value Amax in the Amax register (peak value) is referred to and an operation instruction corresponding to that mode is sent to the target device (e.g., the sequencer, sound source, and/or effecter, etc.)(step S8). Then the trigger flag is set to OFF and the Amax register is cleared to "0" (step S55). Next, any other necessary processing is performed (step S13) and the above processing is looped and repeated (S2~S13).

In the device of this example embodiment, musical control is started when the current value A and the maximum value Amax are compared and the current value A drops below the maximum value Amax, but this invention is not limited to this. For example, could be musical control can be started when the current value A drops by a specified value from the maximum value Amax. For instance, assuming that the specified value is 5 and the current maximum value Amax is 50, processing would not be performed during the time that the current value A was decreasing from 50 to 45, but would be executed for the first time at the point where it reached 44 or lower. By doing this, unintentionally executing processing because of minute movements of the object or noise from external fields can be prevented.

As previously discussed, various embodiments are possible. For example, one embodiment is a musical apparatus which outputs music and includes an optical element having a light source which shines light into the operation space and a light sensor which receives light reflected off an object in the operation space so that a detection value is output based on the quantity of light received by the light sensor, a peak value detector which detects the peak value of the detection value, a signal generator which generates music and a musical controller which controls a musical function of the music when the peak value detector detects a peak value. When an object is moved closer to the light sensor from above the sensor and then, at a desired height, is reversed and moved farther away, a clear peak will occur in the detection value. If the apparatus is set up to perform a musical control instruction based on the peak value, the operator can precisely produce the peak value, making it possible to accurately execute the musical control instruction.

Whether a peak value was detected may be determined by comparing the current detection value with a maximum detection value and determining that the current detection value has dropped from the maximum value, or that the current detection value has dropped from the maximum value by a specified value.

Another embodiment is a musical apparatus which outputs music and includes an optical element which has at least one light source which shines light into the operation space and at least one light sensor which receives light which has been reflected off an object in the operation space so that it has at least two light paths which travel from the light source to the light sensor via the object. A detection value is respectively output based on the quantity of light received via each of the paths. A maximum value detector detects the maximum value of the detection value of the respective detection values up to the present time. Based on the correlation between the maximum values of the detection values of the various paths, a selector selects a musical function from among a plurality of musical functions of different predetermined types for a signal generator which generates music. Since the maximum values of the detection values of the various paths form a variety of patterns depending on the state of motion of the object in this configuration, the content of the operation instructions can be changed according to that state of motion, making it possible to enrich the musical control operation which can be performed.

For instance, if the optical element comprises two light sources and one light sensor situated at the midway position between the two light sources on a lateral straight line and each light source emits chronologically alternating lights and the lights from the respective light sources are received by the light sensor in a time-multiplexed manner, two types of detection signals can be obtained. Since the maximum values of the detection values of the various paths will differ in this configuration when the object passes over the light sensor by moving from right to left as compared to when the object passes over the light sensor by moving from left to right, different kinds of musical control instructions can be selected based on the respective aforementioned conditions of motion. For example, when the detection values of the various paths become equal, the direction of movement of the object is determined by looking at the greater-than/less-than relationship between the maximum values of the detection values of the various paths when the memories were updated, so that a different control instruction is performed depending on the direction of the motion (for example, right to left, or left to right).

Still another embodiment is a musical apparatus which outputs music and includes an optical element equipped with a light source which shines light into the operation space and a light sensor which receives light reflected off an object within the operation space so that a detection value is output based on the quantity of light received by said light sensor, a peak value detector which detects the peak value of the detection value manifested with the motion of said object, a signal generator which outputs music and a selector which divides the range of said peak values in advance into two or more ranges, assigns multiple different types of musical functions respectively to the various ranges, and which selects the musical function corresponding to the range affiliated with the peak value according to the peak value detected by the peak value detector.

Here, when an object is moved closer to the light sensor from above the sensor and then, at a desired height, is reversed and moved farther away, a clear peak will occur in the detection value. If the device is set up so that the musical control instruction changes depending on this peak value, various musical control instructions can be set based on the height position at which the object reversed its direction from an approaching condition to a retreating condition. Consequently, if the content of the musical control instruction changes depending on the range of the peak value (i.e., according to the object motion height), the musical control instructions which are performed according to the object motion condition can be further enriched. In addition, with this device, by discerning at which height position to perform the aforementioned reverse move, the operator can produce peak values according to various positions, making it possible to accurately select the musical control instruction of the desired content.

Determining that a peak value has been detected may be made by comparing the current detection value with a maximum detection value and determining that the current detection value has dropped from the maximum value, or that the current detection value has dropped from the maximum value by a specified value. It is also possible to use negative peak values, where one of ordinary skill in the art would know how to implement a system based on negative peak values and minimum values. Thus, while the embodiments may use the maximum value, embodiments may be modified to use the minimum value.

Another embodiment is a musical apparatus which outputs music and includes a maximum value detector which detects the maximum value up to the present time in the detection value of the respective detection values for each of the paths and a selector which selects a musical control mode (e.g., a musical function) from among a plurality of musical control modes of different predetermined types according to the correlation between the maximum values of the detection values of the various paths, and which aforementioned musical controller executes the musical control mode selected by the selector when the correlation between the current values of the detection values of the various paths reaches a specified relationship.

Still another embodiment is a musical apparatus of the fourth embodiment described above which is further equipped with a musical controller which executes a musical function selected by the aforementioned selector when the aforementioned peak value detector has detected a peak value.

Yet another embodiment is a musical apparatus which outputs music and includes at least one light source which shines light into an operation space, at least one light sensor which receives light which has been reflected by an object in the operation space so that it has at least two light paths which travel from the light source to the light sensor via the object and outputs a respective detection value based on the quantity of light received via each of said paths, a maximum value detector which detects the maximum value up to the present time in the detection value of the respective detection values for each of the paths, a maximum value selector which selects any one of the maximum values according to the correlation between the maximum values of the detection values of the various paths, a selector in which the range of peak values is divided in advance into two or more ranges and multiple different types of musical functions are respectively assigned to the said various ranges and which selects the musical function corresponding to the range affiliated with the peak value according to the peak value detected by the peak value detector, and a musical controller which outputs music and executes the musical function when the correlation between the current values of the detection values of the various paths satisfies a specified relationship.

In addition, the various musical apparatuses described above can include a velocity calculator which determines the motion velocity of said object based on the detection values and a fourth selector which divides the range of values of the motion velocity into two or more ranges, assigns operation instruction contents to each of the ranges, and selects the operation instruction which corresponds with the range affiliated with the motion velocity according to the value of the motion velocity found by the velocity calculator.

If the device is so configured, the content of the operation instructions can vary depending on differences in the motion velocity of the object, thereby further enriching the types of operation instructions which can be executed according to the state of motion of the object.

Thus, desired operation instructions can be reliably executed by moving an object in an operation space. In addition, a variety of operation instructions can be executed depending on the state of motion of the object.

For instance, the configuration of the beam controller is not limited to that described above, and the beam radiation directions of the two infrared light emitting diodes 1A, 1B could, e.g., be inclined inward toward each other, as shown in FIG. 23, instead of being inclined outwardly away from one another. In addition, two infrared sensors 2A, 2B could be situated separated from one another, with an infrared light emitting diode at the mid-way position between the two with its beam irradiation direction oriented in the plumb direction, as shown in FIG. 24. Furthermore, two pairs, with an infrared light emitting diode 1A and infrared sensor 2A situated facing upward comprising one pair and an infrared light emitting diode 1B and infrared sensor 2B likewise situated facing upward comprising another pair, could be arranged separated from one another as shown in FIG. 25. In the example embodiments described above, the content of the operation instruction was changed based on the lateral movement of an object, with light emitting diodes and sensors situated in the horizontal direction. However, the light emitting diodes and sensors could be situated in the horizontal as well as front-back direction so that operation instructions can be executed based on the front-to-back and lateral movement of the object.

Although light emitting diodes may be used as a light source, musical control could be performed based on detection of light of a wavelength in the normal visible light range or the ultraviolet light range, and light emitting diodes may be used which emit lights of these ranges. Further, it is possible to use normal lamps or laser diodes, etc. instead of light emitting diodes. Moreover, electric waves, ultrasonic waves, and magnetism, etc. could be detected instead of light.

In the first example embodiment described above, the reflected lights from the respective light emitting diodes 1A, 1B were discriminated by receiving the reflected lights from the two light emitting diodes 1A, 1B in a time multiplexed manner. However, the reflected lights from the respective light emitting diodes 1A, 1B could be discriminated by making the wavelengths of the lights radiated by the light emitting diodes 1A, 1B different, radiating them simultaneously, and arranging two sensors which correspond to the respective wavelengths on the sensor side (possible methods include isolating the wavelengths with filters, etc.).

In the example embodiments described above, the targets of musical control by the musical apparatus, e.g., an automatic performance device, sound source, and effect rendering device (effecter), etc., may all be provided inside the chassis of an electronic musical instrument and may include the following example types of control:

Automatic performance device: performance data playback instructions, stop instructions, loop playback instructions, mute instructions, volume instructions, pan pot instructions, performance data switching, etc.

Sound source: voice group switching instructions, voice number switching instructions, sound source waveform switching instructions, filter cut-off and/or resonance instructions, LFO (low frequency oscillator) depth and/or rate instructions, envelope instructions, etc.

Effect rendering device: effect ON/OFF instructions, effect type switching instructions, etc.

Other examples of functions which may be controlled include song selection, song switching, playback, record, stop, feed in/feed out, ON/OFF control of built-in effecters, tempo, volume, selection and specification of speakers to which to output music, and switching, selection and specification of equalization patterns and or mixing patterns.

The tone signal generator has been described as one which pre-records performance data which represent a phrase, reads said performance data, and generates a tone signal based on the read performance data. However, anything could be used as the tone signal generator as long as it is able to produce a tone signal. For example, multiple tone waveform data which represent a phrase could be pre-recorded in the sound source 8 of an embodiment described above and performance data specifies which tone waveform data is to be read, thereby producing a tone signal by reading the specified tone waveform data.

In this case, a performance operation means, such as a keyboard or keypads, etc. as shown by the dotted lines in FIG. 1, could be used and performance data could be generated from the performance operation means according to the performance operation by the performer so as to read the tone waveform data which correspond to said performance data. Alternatively, it could be a performance data input terminal which inputs performance data from an external device, such as a MIDI signal, etc. and a tone signal is generated based on the performance data which was input from the performance data input terminal.

In the case that the tone signal is produced by reading tone waveform data, when the detection value of the reflected light satisfies a certain condition, the tone waveform data which corresponds to the condition which was satisfied among multiple tone waveform data could be read.

The tone signal generator could comprise specialized hardware, or it could comprise a processing device, such as a CPU or DSP, etc., and the processing program executed by said processing device.

The musical controller and selector could also comprise hardware, or they could comprise a processing device, such as a CPU or DSP, etc., and the processing program executed by said processing device.

In contrast to the musical apparatus discussed above, a general control device may control, for example, the following types of devices external to the general control device:

1. radio and cassette players, CD players, DJ mixers, hard disk recorders, MD players, DAT devices, mixers, amplifiers, equalizers, and other studio equipment.

2. video decks, DVD, LD players, liquid crystal projectors, and video mixers. A general control device may control the switching of video images in synchronization with musical control, wipe specification, selection of wipe patterns, video cueing and specification (VISS/VASS), and control of the audio components of video equipment.

3. Control of lighting and other equipments at meeting places. Meeting places could include, for example, halls, stadiums and clubs. Typical examples of types of control are controlling lighting in synchronization with musical control, actuating electronic flash in synchronization with musical control, switching color or color pattern of lighting in a meeting room in synchronization with musical control, setting off fireworks in synchronization with musical control, etc.

4. Control of combinations of the devices in 1.–3. above.

From the foregoing description of the preferred embodiments of the invention, those skilled in the art will perceive improvements, changes and modifications in the invention. Such improvements, changes and modifications within the skill of the art are intended to be covered by the appended claims.

We claim:

1. An electronic musical apparatus which responds to the motion of an object within a specified space to control the music output by said electronic musical apparatus, wherein said electronic musical apparatus comprises:

an optical element including at least one light source which shines light into said specified space and at least one light sensor which receives light which has been reflected by an object in said specified space such that said optical element has at least two light paths extending from said light source to said object and then to said light sensor, said optical element outputs detection values corresponding to the quantity of light received from each of said two light paths respectively;

a signal generator which generates music; and a musical controller which, when the correlation between the current values of the detection values of said two light paths satisfy a specified relationship, controls the music generated by said signal generator.

2. An electronic musical apparatus which responds to the motion of an object within a specified space to control the music output by said electronic musical apparatus, wherein said electronic musical apparatus comprises:

an optical element including a light source which shines light into said specified space and a light sensor which receives light reflected off an object within said specified space, said optical element outputs a detection value corresponding to the quantity of light received by said light sensor, a peak value detector which detects the peak value of said detection value, a signal generator which generates music; and a musical controller which, when said peak value detector detects a peak value, controls the music generated by said signal generator.

3. An electronic musical apparatus which responds to the motion of an object within a specified space to control the music output by said electronic musical apparatus, wherein said electronic musical apparatus comprises:

an optical element including at least one light source which shines light into said specified space and at least one light sensor which receives light reflected off an object in said specified space such that said optical element has at least two light paths extending from said light source to said light sensor via said object, said optical element outputs detection values corresponding to the quantity of light received from each of said two light paths respectively, a maximum value detector which detects the maximum value of said detection value of said respective detection values for each of said two light paths;

a signal generator which generates music; and a selector which selects a musical function from among a plurality of musical functions of said signal generator based on the correlation between said maximum values of said detection values of said two light paths.

4. An electronic musical apparatus which responds to the motion of an object within a specified space to control the music output by said electronic musical apparatus, wherein said electronic musical apparatus comprises:

an optical element including a light source which shines light into said specified space and a light sensor which receives light reflected off an object within said specified space such that said optical element outputs a detection value corresponding to the quantity of light received by said light sensor;

a peak value detector which detects the peak value of said detection value;

a signal generator which generates music; and a selector in which the range of said peak values are divided in advance into two or more ranges and each of multiple different types of musical functions of said signal generator is respectively assigned to said ranges, said selector selects the musical function corresponding to the range affiliated with said peak value detected by said peak value detector.

5. The electronic musical apparatus of claim 1 further comprising:

a maximum value detector which detects the maximum value of said detection value of said respective detection values for each of said two light paths and a selector which selects a musical function from among a plurality of musical functions based on the correlation between the maximum values of said detection values of said two light paths, wherein said musical controller operates said musical function selected by said selector when the correlation between the current values of said detection values of said two light paths satisfies a specified relationship.

6. The electronic musical apparatus of claim 4 further comprising a musical controller which operates said musical function selected by said selector at the time when said peak value detector detects a peak value.

7. The electronic musical apparatus of claim 2 wherein said peak value detector detects the peak value of the detection value which is detected after said detection value has dropped below a specified value.

8. The electronic musical apparatus of claim 3 wherein said maximum value detector detects the maximum value of the detection value which has been detected after said detection value has dropped below a specified value.

9. The electronic musical apparatus of claim 4 wherein said peak value detector detects the peak value of the detection value which has been detected after said detection value has dropped below a specified value.

10. The electronic musical apparatus of claim 1 wherein said signal generator is a tone signal generator which generates a tone signal by reading data which represent a pre-recorded phrase and said musical controller instructs said tone signal generator to control the reading of the data which represents said phrase.

11. The electronic musical apparatus of claim 2 wherein said signal generator is a tone signal generator which generates a tone signal by reading data which represent a pre-recorded phrase and said musical controller instructs said tone signal generator to control the reading of the data which represents said phrase.

12. The electronic musical apparatus of claim 1 wherein said signal generator is a tone signal generator which generates a tone signal whose characteristics are controlled by said musical controller.

13. The electronic musical apparatus of claim 3 wherein said signal generator is a tone signal generator which generates a tone signal by reading data which represent a pre-recorded phrase and said selector selects the musical function for reading the data which represents said phrase.

14. The electronic musical apparatus of claim 2 wherein said signal generator is a tone signal generator which generates a tone signal whose characteristics are controlled by said musical controller.

15. The electronic musical apparatus of claim 4 wherein said signal generator is a tone signal generator which generates a tone signal by reading data which represent a pre-recorded phrase and said selector selects the musical function for reading the data which represents said phrase.

16. The electronic musical apparatus of claim 3 wherein said signal generator is a tone signal generator which generates a tone signal and said musical function controls the characteristics of said tone signal.

17. The electronic musical apparatus of claim 4 wherein said signal generator is a tone signal generator which generates a tone signal and said musical function controls the characteristics of said tone signal.

18. A method of controlling and outputting music based on the motion of an object within a specified space, said method comprising the steps of:

emitting light into a specified space;

receiving light reflected off an object within said specified space from at least two light paths;

generating at least two detection values, each of which is based on the quantity of light received from each of said at least two light paths;

determining whether the current values of said at least two detection values satisfy a specified relationship; and outputting music, and when the correlation between the current values of said at least two detection values is determined to satisfy a specified relationship, controlling the music.

19. A method of controlling and outputting music based on the motion of an object within a specified space, said method comprising the steps of:

emitting light into a specified space;

receiving light reflected off an object within said specified space;

generating a detection value based on the quantity of light received;

detecting the peak value of said detection value; and outputting music, and when a peak value is detected, controlling the music.

20. A method of controlling and outputting music based on the motion of an object within a specified space, said method comprising the steps of:

emitting light into a specified space;

receiving light reflected off an object within said specified space from at least two light paths;

generating at least two detection values, each of which is based on the quantity of light received from each of said at least two light paths;

detecting the maximum value of each of said at least two detection values;

selecting a first musical function from among a plurality of musical functions based on the correlation between said maximum values of said detection values; and outputting music based on said first musical function.

21. A method of controlling and outputting music based on the motion of an object within a specified space, said method comprising the steps of:

emitting light into a specified space;

receiving light reflected off an object within said specified space and generating a detection value based on the quantity of light received, detecting the peak value of said detection value, dividing the range of said peak values in advance into at least two ranges;

assigning each one of a plurality of musical functions to a respective range of said peak values;

determining which of said at least two ranges said detected peak value falls within;

selecting the musical function corresponding to said determined range; and outputting music based on said selected musical function.

* * * * *